(12) United States Patent
Thirumalai et al.

(10) Patent No.: US 9,877,048 B2
(45) Date of Patent: Jan. 23, 2018

(54) ENTROPY CODING TECHNIQUES FOR DISPLAY STREAM COMPRESSION (DSC)

(71) Applicant: QUALCOMM Incorporated, San Diego, CA (US)

(72) Inventors: Vijayaraghavan Thirumalai, San Diego, CA (US); Natan Haim Jacobson, San Diego, CA (US); Rajan Laxman Joshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 14/733,722

(22) Filed: Jun. 8, 2015

(65) Prior Publication Data
US 2015/0358645 A1 Dec. 10, 2015

Related U.S. Application Data

(60) Provisional application No. 62/009,838, filed on Jun. 9, 2014, provisional application No. 62/034,084, filed
(Continued)

(51) Int. Cl.
H04N 19/91 (2014.01)
H04N 19/105 (2014.01)
H04N 19/119 (2014.01)
H04N 19/13 (2014.01)
H04N 19/132 (2014.01)
H04N 19/136 (2014.01)
H04N 19/157 (2014.01)
(Continued)

(52) U.S. Cl.
CPC ............ H04N 19/91 (2014.11); H04N 19/105 (2014.11); H04N 19/119 (2014.11); H04N 19/13 (2014.11);
(Continued)

(58) Field of Classification Search
CPC .... H04N 19/91; H04N 19/105; H04N 19/119; H04N 19/13; H04N 19/132;
(Continued)

(56) References Cited

U.S. PATENT DOCUMENTS

2004/0131272 A1 7/2004 Kobayashi et al.
2005/0053300 A1* 3/2005 Mukerjee ............. H04N 19/105
382/239
(Continued)

FOREIGN PATENT DOCUMENTS

EP 1 619 901 * 7/2005 ............... H04N 7/26
EP 1619901 A2 1/2006
(Continued)

OTHER PUBLICATIONS

International Search Report and Written Opinion—PCT/US2015/034837—ISA/EPO—dated Dec. 16, 2015.
(Continued)

Primary Examiner — Jay Patel
Assistant Examiner — Marnie Matt
(74) Attorney, Agent, or Firm — Knobbe, Martens, Olson & Bear, LLP

(57) ABSTRACT

Entropy coding techniques for display stream compression (DSC) are disclosed. In one aspect, a method of entropy coding video data includes partitioning a block of the video data into a plurality of groups of samples based at least in part on a coding mode of the block. The method further includes entropy coding the block via performing a group-wise skip on at least one of the groups in response to all of the samples in the at least one group being equal to a predetermined value.

28 Claims, 15 Drawing Sheets

Related U.S. Application Data on Aug. 6, 2014, provisional application No. 62/146,060, filed on Apr. 10, 2015.

(51) Int. Cl.
*H04N 19/159* (2014.01)
*H04N 19/176* (2014.01)
*H04N 19/186* (2014.01)
*H04N 19/46* (2014.01)

(52) U.S. Cl.
CPC ......... *H04N 19/132* (2014.11); *H04N 19/136* (2014.11); *H04N 19/157* (2014.11); *H04N 19/159* (2014.11); *H04N 19/176* (2014.11); *H04N 19/186* (2014.11); *H04N 19/46* (2014.11)

(58) Field of Classification Search
CPC .. H04N 19/136; H04N 19/157; H04N 19/159; H04N 19/176; H04N 19/186; H04N 19/46
See application file for complete search history.

(56) References Cited

U.S. PATENT DOCUMENTS

| | | | |
|---|---|---|---|
| 2005/0053302 A1* | 3/2005 | Srinivasan | H04N 19/52 382/248 |
| 2009/0097568 A1* | 4/2009 | Karczewicz | H04N 19/70 375/240.24 |
| 2011/0090967 A1* | 4/2011 | Chen | H04N 19/70 375/240.16 |
| 2014/0294089 A1* | 10/2014 | MacInnis | H04N 19/63 375/240.19 |
| 2015/0341643 A1* | 11/2015 | Xu | H04N 19/593 375/240.02 |

FOREIGN PATENT DOCUMENTS

| | | |
|---|---|---|
| EP | 1713279 A1 | 10/2006 |
| GB | 2308768 A | 7/1997 |

OTHER PUBLICATIONS

Partial International Search Report—PCT/US2015/034837—ISA/EPO—dated Sep. 9, 2015.

Sullivan G. J. et al., "Overview of the High Efficiency Video Coding (HEVC) Standard", IEEE Transactions on Circuits and Systems for Video Technology, Jan. 1, 2012 (Jan. 1, 2012), pp. 1-19, XP055045358, ISSN: 1051-8215, DOI: 10.1109/TCSVT.2012.2221191.

Walls F., et al., "BDC-1: A Robust Algorithm for Display Stream Compression", 2013 Picture Coding Symposium (PCS), IEEE, Dec. 8, 2013 (Dec. 8, 2013), pp. 434-437, XP032567035, DOI: 10.1109/PCS.2013.6737776 [retrieved on Feb. 11, 2014].

* cited by examiner

| SAMPLE 0 201 | SAMPLE 1 203 | SAMPLE 2 205 | SAMPLE 3 207 | SAMPLE 4 209 | SAMPLE 5 211 | SAMPLE 6 213 | SAMPLE 7 215 | SAMPLE 8 217 | SAMPLE 9 219 | SAMPLE 10 221 | SAMPLE 11 223 | SAMPLE 12 225 | SAMPLE 13 227 | SAMPLE 14 229 | SAMPLE 15 231 |
|---|---|---|---|---|---|---|---|---|---|---|---|---|---|---|---|
| GROUP 1 | | | | GROUP 2 | | | | GROUP 3 | | | | GROUP 4 | | | |

FIG. 3

| C00 | C01 | C02 | C03 |
|---|---|---|---|
| C04 | C05 | C06 | C07 |
| C08 | C09 | C10 | C11 |
| C12 | C13 | C14 | C15 |

FIG. 8

ENTROPY CODING TECHNIQUES FOR DISPLAY STREAM COMPRESSION (DSC)

INCORPORATION BY REFERENCE TO PRIORITY APPLICATIONS

This application claims the benefit of U.S. Provisional Application No. 62/009,838, filed Jun. 9, 2014, U.S. Provisional Application No. 62/034,084, filed Aug. 6, 2014, and U.S. Provisional Application No. 62/146,060, filed Apr. 10, 2015.

TECHNICAL FIELD

This disclosure relates to the field of video coding and compression, and particularly to video compression for transmission over display links, such as display stream compression (DSC).

BACKGROUND

Digital video capabilities can be incorporated into a wide range of displays, including digital televisions, personal digital assistants (PDAs), laptop computers, desktop monitors, digital cameras, digital recording devices, digital media players, video gaming devices, video game consoles, cellular or satellite radio telephones, video teleconferencing devices, and the like. Display links are used to connect displays to appropriate source devices. The bandwidth requirements of display links are proportional to the resolution of the displays, and thus, high-resolution displays require large bandwidth display links. Some display links do not have the bandwidth to support high resolution displays. Video compression can be used to reduce the bandwidth requirements such that lower bandwidth display links can be used to provide digital video to high resolution displays.

Others have tried to utilize image compression on the pixel data. However, such schemes are sometimes not visually lossless or can be difficult and expensive to implement in conventional display devices.

The Video Electronics Standards Association (VESA) has developed display stream compression (DSC) as a standard for display link video compression. The display link video compression technique, such as DSC, should provide, among other things, picture quality that is visually lossless (i.e., pictures having a level of quality such that users cannot tell the compression is active). The display link video compression technique should also provide a scheme that is easy and inexpensive to implement in real-time with conventional hardware.

SUMMARY

The systems, methods and devices of this disclosure each have several innovative aspects, no single one of which is solely responsible for the desirable attributes disclosed herein.

In one aspect, a method of entropy encoding video data, comprises partitioning a block of the video data into a plurality of groups of samples based at least in part on a coding mode of the block; and entropy encoding the block via performing a group-wise skip on at least one of the plurality of groups in response to all of the samples in the at least one group having a value equal to a predetermined value, the group-wise skip comprising signaling a group-wise skip value and refraining from encoding the samples in the at least one group.

In another aspect, a device for entropy encoding video data comprises a memory configured to store the video data; and a processor in communication with the memory and configured to: partition a block of the video data into a plurality of groups of samples based at least in part on a coding mode of the block; and entropy encode the block via performing a group-wise skip on at least one of the plurality of groups in response to all of the samples in the at least one group having a value equal to a predetermined value, the group-wise skip comprising signaling a group-wise skip value and refraining from encoding the samples in the at least one group.

In another aspect, a method of entropy decoding video data comprises receiving a bitstream representing a block of the video data, the block comprising a plurality of groups of samples, the bitstream including at least one group-wise skip value indicating that a corresponding group of samples of the block is not included in the bitstream; generating the plurality of groups of samples via entropy decoding the bitstream based at least in part on the group-wise skip value; and reconstructing the block based at least in part on the plurality of groups of samples and a coding mode of the block.

In yet another aspect, a device for entropy decoding video data comprises a memory configured to store a bitstream representing a block of the video data, the block comprising a plurality of groups of samples, the bitstream including at least one group-wise skip value indicating that a corresponding group of samples of the block is not included in the bitstream; and a processor in communication with the memory and configured to: generate the plurality of groups of samples via entropy decoding the bitstream based at least in part on the group-wise skip value; and reconstruct the block based at least in part on the plurality of groups of samples and a coding mode of the block.

BRIEF DESCRIPTION OF THE DRAWINGS

FIG. 3 is a diagram illustrating a method of partitioning a block for a prediction coding mode in accordance with aspects described in this disclosure.

FIG. 8 is a diagram illustrating another method of partitioning a block for a transform coefficient coding mode in accordance with aspects described in this disclosure.

DETAILED DESCRIPTION

Figure 1A:
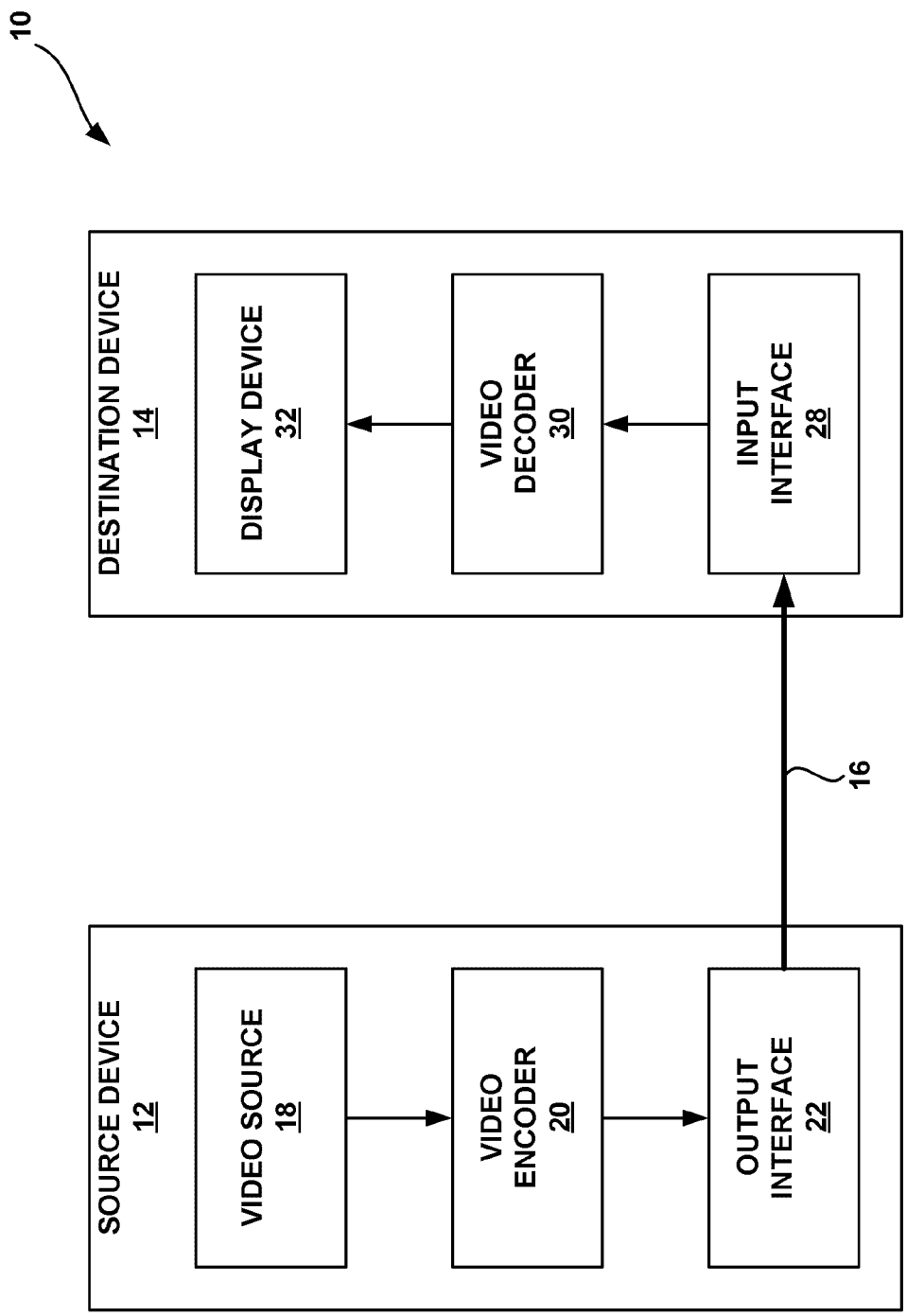
FIG. 1A is a block diagram illustrating an example video encoding and decoding system that may utilize techniques in accordance with aspects described in this disclosure.

In general, this disclosure relates to methods of improving video compression techniques such as display stream compression (DSC). More specifically, the present disclosure relates to systems and methods for entropy coding including partitioning a video data block into a plurality of groups of samples.

While certain embodiments are described herein in the context of the DSC standard, one having ordinary skill in the art would appreciate that systems and methods disclosed herein may be applicable to any suitable video coding standard. For example, embodiments disclosed herein may be applicable to one or more of the following standards: International Telecommunication Union (ITU) Telecommunication Standardization Sector (ITU-T) H.261, International Organization for Standardization/International Electrotechnical Commission (ISO/IEC) Moving Picture Experts Group-1 (MPEG-1) Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), High Efficiency Video Coding (HEVC), and any extensions to such standards. Also, the techniques described in this disclosure may become part of standards developed in the future. In other words, the techniques described in this disclosure may be applicable to previously developed video coding standards, video coding standards currently under development, and forthcoming video coding standards.

Entropy coding is a method of coding information that generally includes representing each unique symbol of the information with a variable-length codeword. In entropy coding, more common symbols are typically represented using shorter codewords. Accordingly, since the more common symbols are represented using fewer bits based on the use of shorter codewords, the information can be compressed.

Version 1.0 of the DSC standard proposes delta size unit-variable length coding (DSU-VLC) semantics. In version 1.0 of the DSC standard, each DSU-VLC unit codes the residual values of a group of pixels using prefix and suffix parts. At least one aspect of this disclosure relates to the incorporation of entropy coding principles into DSU-VLC style coding semantics (which will hereinafter be generally referred to interchangeably with DSU-VLC). Accordingly, at least one aspect of this disclosure can integrate the coding efficiencies associated with entropy coding into the DSU-VLC semantics.

A number of popular entropy coding techniques exist, such as Huffman, Arithmetic, Exponential-Golomb, Rice codes etc. However, these techniques typically have a limited throughput of 1 sample/clock, which may be too low for certain applications such as high resolution displays and panels. That is, conventional coding hardware may not have a sufficient clock rate to be able to take advantage of the popular entropy coding techniques while maintaining a visually lossless coding rate, as is desirable in certain coding standard such as the DSC standard. Accordingly, at least one aspect of this disclosure relates to entropy coding techniques which have higher throughputs, for example, a throughput of 4 samples/clock.

Video Coding Standards

A digital image, such as a video image, a TV image, a still image or an image generated by a video recorder or a computer, may include pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impractical. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), and HEVC including extensions of such standards.

In addition, a video coding standard, namely DSC, has been developed by VESA. The DSC standard is a video compression standard which can compress video for transmission over display links. As the resolution of displays increases, the bandwidth of the video data required to drive the displays increases correspondingly. Some display links may not have the bandwidth to transmit all of the video data to the display for such resolutions. Accordingly, the DSC standard specifies a compression standard for interoperable, visually lossless compression over display links.

The DSC standard is different from other video coding standards, such as H.264 and HEVC. DSC includes intra-frame compression, but does not include inter-frame compression, meaning that temporal information may not be used by the DSC standard in coding the video data. In contrast, other video coding standards may employ inter-frame compression in their video coding techniques.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" or "coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
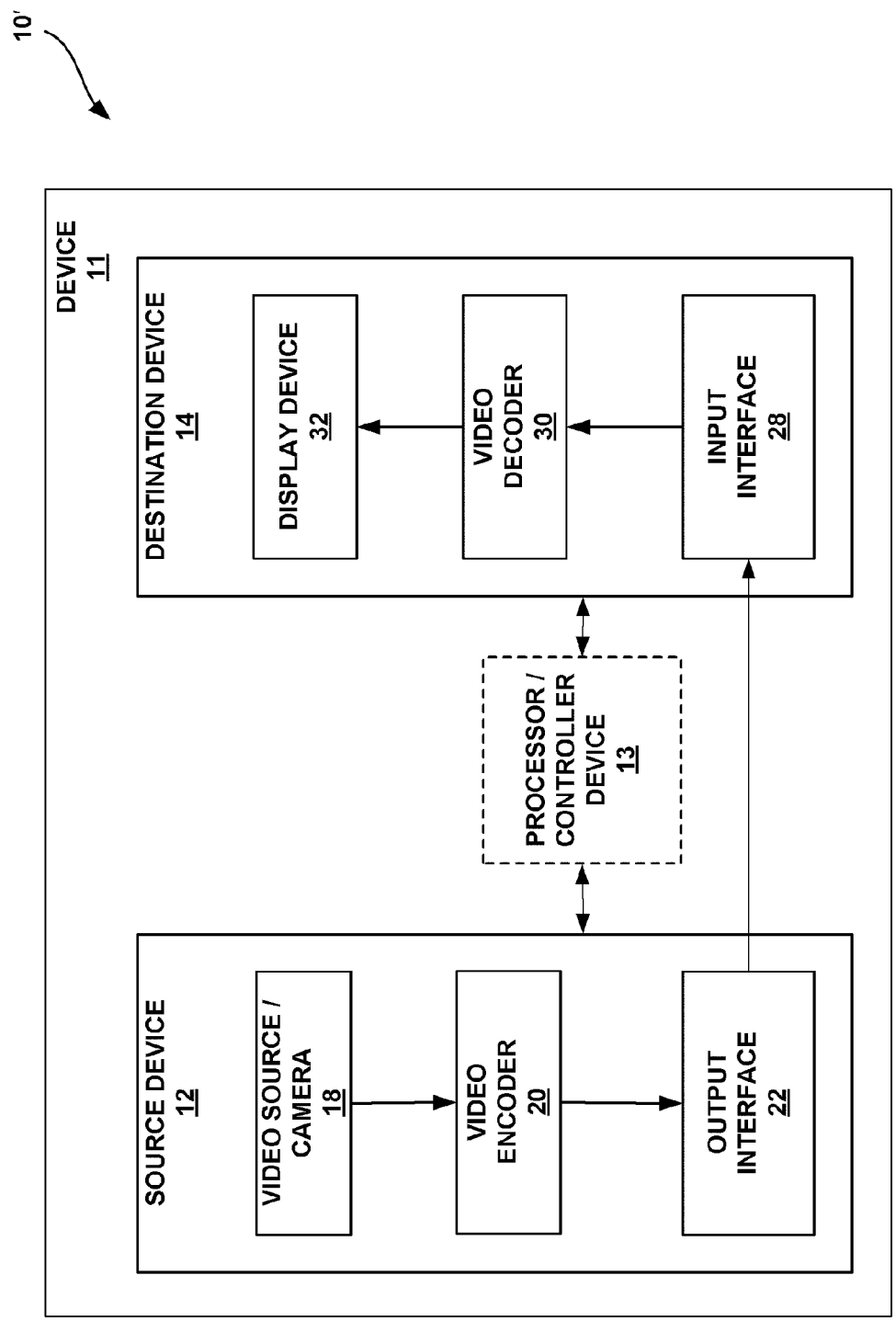
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 constitute separate devices. It is noted, however, that the source device 12 and destination device 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, in-car computers, video streaming devices, devices that are wearable (or removeably attachable) by (to) an entity (e.g., a human, an animal, and/or another controlled device) such as eyewear and/or a wearable computer, devices or apparatus that can be consumed, ingested, or placed within an entity, and/or the like. In various embodiments, the source device 12 and the destination device 14 may be equipped for wireless communication.

The destination device 14 may receive, via link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In the example of FIG. 1A, the source device 12 includes a video source 18, video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called "camera phones" or "video phones", as illustrated in the example of FIG. 1B. However, the techniques described in this disclosure may be applicable to video coding in general, and may be applied to wireless and/or wired applications.

The captured, pre-captured, or computer-generated video may be encoded by the video encoder 20. The encoded video data may be transmitted to the destination device 14 via the output interface 22 of the source device 12. The encoded video data may also (or alternatively) be stored onto the storage device 31 for later access by the destination device 14 or other devices, for decoding and/or playback. The video encoder 20 illustrated in FIGS. 1A and 1B may comprise the video encoder 20 illustrated FIG. 2A or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by the video encoder 20 for use by a video decoder, such as the video decoder 30, in decoding the video data. Such syntax elements may be included with the encoded video data transmitted on a communication medium, stored on a storage medium, or stored a file server. The video decoder 30 illustrated in FIGS. 1A and 1B may comprise the video decoder 30 illustrated in FIG. 2B or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video coding system 10' wherein the source device 12 and the destination device 14 are on or part of a device 11. The device 11 may be a telephone handset, such as a "smart" phone or the like. The device 11 may include a processor/controller device 13 (optionally present) in operative communication with the source device 12 and the destination device 14. The video coding system 10' of FIG. 1B, and components thereof, are otherwise similar to the video coding system 10 of FIG. 1A, and components thereof.

The video encoder 20 and the video decoder 30 may operate according to a video compression standard, such as DSC. Alternatively, the video encoder 20 and the video decoder 30 may operate according to other proprietary or industry standards, such as the ITU-T H.264 standard, alternatively referred to as MPEG-4, Part 10, AVC, HEVC or extensions of such standards. The techniques of this disclosure, however, are not limited to any particular coding standard. Other examples of video compression standards include MPEG-2 and ITU-T H.263.

Although not shown in the examples of FIGS. 1A and 1B, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder in a respective device.

Video Coding Process

As mentioned briefly above, the video encoder 20 encodes video data. The video data may comprise one or more pictures. Each of the pictures is a still image forming part of a video. In some instances, a picture may be referred to as a video "frame." When the video encoder 20 encodes the video data, the video encoder 20 may generate a bitstream. The bitstream may include a sequence of bits that form a coded representation of the video data. The bitstream may include coded pictures and associated data. A coded picture is a coded representation of a picture.

To generate the bitstream, the video encoder 20 may perform encoding operations on each picture in the video data. When the video encoder 20 performs encoding operations on the pictures, the video encoder 20 may generate a series of coded pictures and associated data. The associated data may include a set of coding parameters such as a quantization parameter (QP). To generate a coded picture, the video encoder 20 may partition a picture into equally-sized video blocks. A video block may be a two-dimensional array of samples. The coding parameters may define a coding option (e.g., a coding mode) for every block of the video data. The coding option may be selected in order to achieve a desired rate-distortion performance.

In some examples, the video encoder 20 may partition a picture into a plurality of slices. Each of the slices may include a spatially distinct region in an image (e.g., a frame) that can be decoded independently without information from the rest of the regions in the image or frame. Each image or video frame may be encoded in a single slice or each image or video frame may be encoded in several slices. In DSC, the target bits allocated to encode each slice may be substantially constant. As part of performing an encoding operation on a picture, the video encoder 20 may perform encoding operations on each slice of the picture. When the video encoder 20 performs an encoding operation on a slice, the video encoder 20 may generate encoded data associated with the slice. The encoded data associated with the slice may be referred to as a "coded slice."

DSC Video Encoder

Figure 2A:
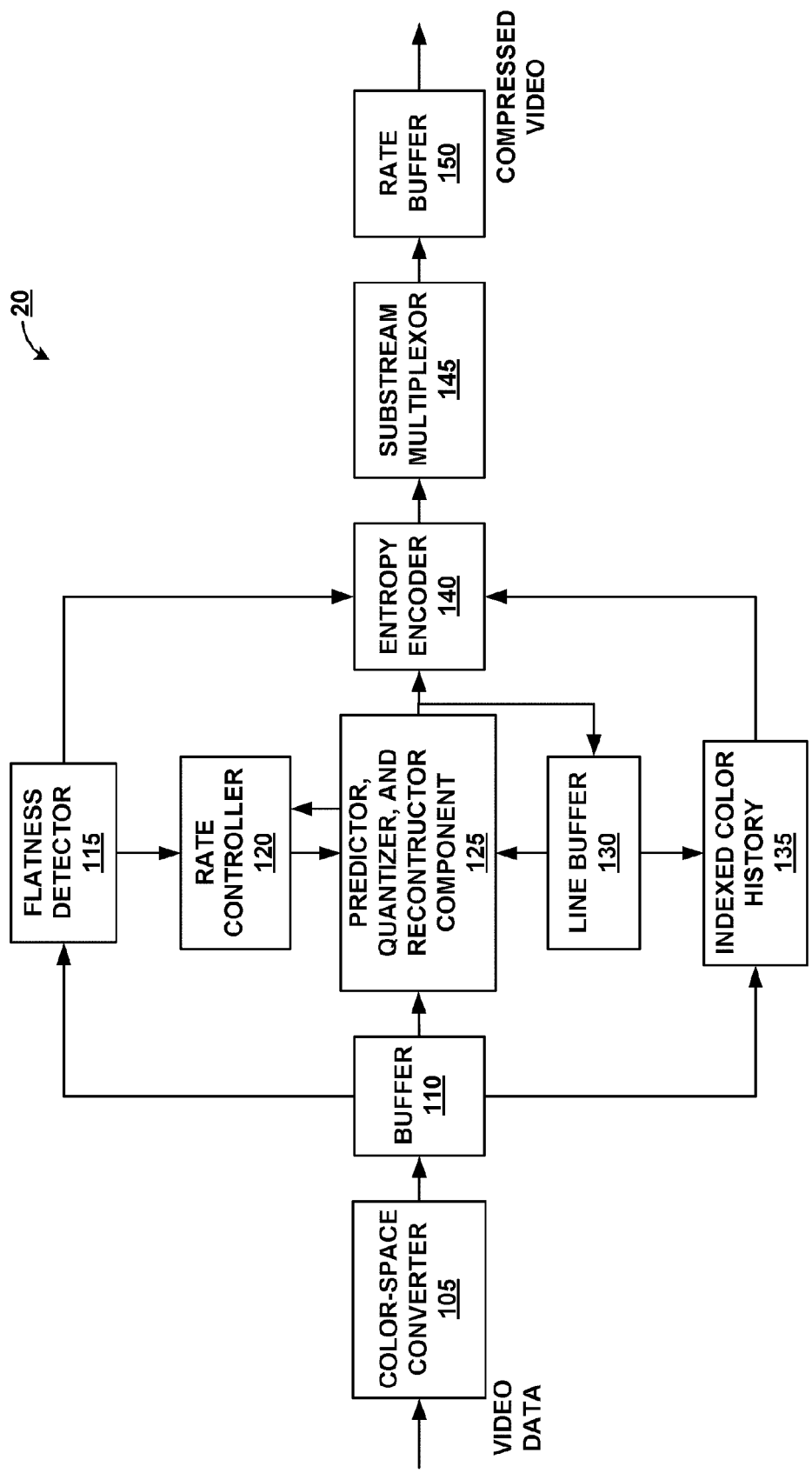
FIG. 2A is a block diagram illustrating an example of a video encoder that may implement techniques in accordance with aspects described in this disclosure.

FIG. 2A is a block diagram illustrating an example of the video encoder 20 that may implement techniques in accordance with aspects described in this disclosure. The video encoder 20 may be configured to perform some or all of the techniques of this disclosure. In some examples, the techniques described in this disclosure may be shared among the various components of the video encoder 20. In some examples, additionally or alternatively, a processor (not shown) may be configured to perform some or all of the techniques described in this disclosure.

For purposes of explanation, this disclosure describes the video encoder 20 in the context of DSC coding. However, the techniques of this disclosure may be applicable to other coding standards or methods.

In the example of FIG. 2A, the video encoder 20 includes a plurality of functional components. The functional components of the video encoder 20 include a color-space converter 105, a buffer, 110, a flatness detector 115, a rate controller 120, a predictor, quantizer, and reconstructor component 125, a line buffer 130, an indexed color history 135, an entropy encoder 140, a substream multiplexor 145, and a rate buffer 150. In other examples, the video encoder 20 may include more, fewer, or different functional components.

The color-space 105 converter may convert an input color-space to the color-space used in the coding implementation. For example, in one exemplary embodiment, the color-space of the input video data is in the red, green, and blue (RGB) color-space and the coding is implemented in the luminance Y, chrominance green Cg, and chrominance orange Co (YCgCo) color-space. The color-space conversion may be performed by method(s) including shifts and additions to the video data. It is noted that input video data in other color-spaces may be processed and conversions to other color-spaces may also be performed.

In related aspects, the video encoder 20 may include the buffer 110, the line buffer 130, and/or the rate buffer 150. For example, the buffer 110 may hold the color-space converted video data prior to its use by other portions of the video encoder 20. In another example, the video data may be stored in the RGB color-space and color-space conversion may be performed as needed, since the color-space converted data may require more bits.

The rate buffer 150 may function as part of the rate control mechanism in the video encoder 20, which will be described in greater detail below in connection with rate controller 120. The bits spent on encoding each block can vary highly substantially based on the nature of the block. The rate buffer 150 can smooth the rate variations in the compressed video. In some embodiments, a constant bit rate (CBR) buffer model is employed in which bits are taken out from the buffer at a constant bit rate. In the CBR buffer model, if the video encoder 20 adds too many bits to the bitstream, the rate buffer 150 may overflow. On the other hand, the video encoder 20 must add enough bits in order to prevent underflow of the rate buffer 150.

On the video decoder side, the bits may be added to rate buffer 155 of the video decoder 30 (see FIG. 2B which is described in further detail below) at a constant bit rate, and the video decoder 30 may remove variable numbers of bits for each block. To ensure proper decoding, the rate buffer 155 of the video decoder 30 should not "underflow" or "overflow" during the decoding of the compressed bit stream.

In some embodiments, the buffer fullness (BF) can be defined based on the values BufferCurrentSize representing the number of bits currently in the buffer and BufferMaxSize representing the size of the rate buffer 150, i.e., the maximum number of bits that can be stored in the rate buffer 150 at any point in time. The BF may be calculated as:

BF=((BufferCurrentSize*100)/BufferMaxSize)

The flatness detector 115 can detect changes from complex (i.e., non-flat) areas in the video data to flat (i.e., simple or uniform) areas in the video data. The terms "complex" and "flat" will be used herein to generally refer to the difficulty for the video encoder 20 to encode the respective regions of the video data. Thus, the term complex as used herein generally describes a region of the video data as being complex for the video encoder 20 to encode and may, for example, include textured video data, high spatial frequency, and/or other features which are complex to encode. The term flat as used herein generally describes a region of the video data as being simple for the video encoder 20 to encoder and may, for example, include a smooth gradient in the video data, low spatial frequency, and/or other features which are simple to encode. The transitions between complex and flat regions may be used by the video encoder 20 to reduce quantization artifacts in the encoded video data. Specifically, the rate controller 120 and the predictor, quantizer, and reconstructor component 125 can reduce such quantization artifacts when the transitions from complex to flat regions are identified.

The rate controller 120 determines a set of coding parameters, e.g., a QP. The QP may be adjusted by the rate controller 120 based on the buffer fullness of the rate buffer 150 and image activity of the video data in order to maximize picture quality for a target bitrate which ensures that the rate buffer 150 does not overflow or underflow. The rate controller 120 also selects a particular coding option (e.g., a particular mode) for each block of the video data in order to achieve the optimal rate-distortion performance. The rate controller 120 minimizes the distortion of the reconstructed images such that it satisfies the bit-rate constraint, i.e., the overall actual coding rate fits within the target bit rate.

The predictor, quantizer, and reconstructor component 125 may perform at least three encoding operations of the video encoder 20. The predictor, quantizer, and reconstructor component 125 may perform prediction in a number of different modes. One example predication mode is a modified version of median-adaptive prediction. Median-adaptive prediction may be implemented by the lossless JPEG standard (JPEG-LS). The modified version of median-adaptive prediction which may be performed by the predictor, quantizer, and reconstructor component 125 may allow for parallel prediction of three consecutive sample values. Another example prediction mode is block prediction. In block prediction, samples are predicted from previously reconstructed pixels in the line above or to the left in the same line. In some embodiments, the video encoder 20 and the video decoder 30 may both perform an identical search on reconstructed pixels to determine the block prediction usages, and thus, no bits need to be sent in the block prediction mode. In other embodiments, the video encoder 20 may perform the search and signal block prediction vectors in the bitstream, such that the video decoder 30 need not perform a separate search. A midpoint prediction mode may also be implemented in which samples are predicted using the midpoint of the component range. The midpoint prediction mode may enable bounding of the number of bits required for the compressed video in even the worst-case sample. As further discussed below with reference to FIGS. 3-6, the predictor, quantizer, and reconstructor component 125 may be configured to predict (e.g., encode or decode) the block of video data (or any other unit of prediction) by performing the methods illustrated in FIGS. 3-6.

The predictor, quantizer, and reconstructor component 125 also performs quantization. For example, quantization may be performed via a power-of-2 quantizer which may be implemented using a shifter. It is noted that other quantization techniques may be implemented in lieu of the power-of-2 quantizer. The quantization performed by the predictor, quantizer, and reconstructor component 125 may be based on the QP determined by the rate controller 120. Finally, the predictor, quantizer, and reconstructor component 125 also performs reconstruction which includes adding the inverse quantized residual to the predicted value and ensuring that the result does not fall outside of the valid range of sample values.

It is noted that the above-described example approaches to prediction, quantization, and reconstruction performed by the predictor, quantizer, and reconstructor component 125 are merely illustrative and that other approaches may be implemented. It is also noted that the predictor, quantizer, and reconstructor component 125 may include subcomponent(s) for performing the prediction, the quantization, and/or the reconstruction. It is further noted that the prediction, the quantization, and/or the reconstruction may be performed by several separate encoder components in lieu of the predictor, quantizer, and reconstructor component 125.

The line buffer 130 holds the output from the predictor, quantizer, and reconstructor component 125 so that the predictor, quantizer, and reconstructor component 125 and the indexed color history 135 can use the buffered video data. The indexed color history 135 stores recently used pixel values. These recently used pixel values can be referenced directly by the video encoder 20 via a dedicated syntax.

The entropy encoder 140 encodes the prediction residuals and any other data (e.g., indices identified by the predictor, quantizer, and reconstructor component 125) received from the predictor, quantizer, and reconstructor component 125 based on the indexed color history 135 and the flatness transitions identified by the flatness detector 115. In some examples, the entropy encoder 140 may encode three samples per clock per substream encoder. The substream multiplexor 145 may multiplex the bitstream based on a headerless packet multiplexing scheme. This allows the video decoder 30 to run three entropy decoders in parallel, facilitating the decoding of three pixels per clock. The substream multiplexor 145 may optimize the packet order so that the packets can be efficiently decoded by the video decoder 30. It is noted that different approaches to entropy coding may be implemented, which may facilitate the decoding of power-of-2 pixels per clock (e.g., 2 pixels/clock or 4 pixels/clock).

DSC Video Decoder

Figure 2B:
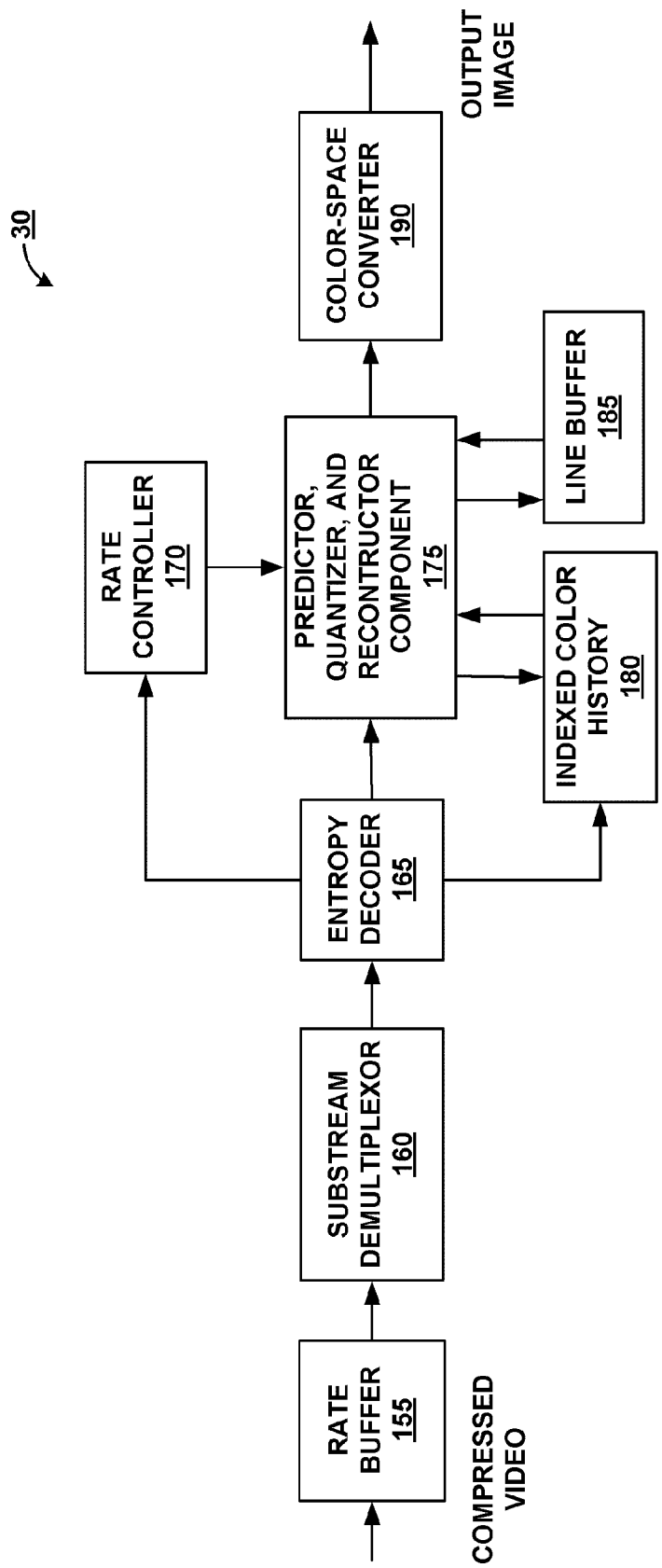
FIG. 2B is a block diagram illustrating an example of a video decoder that may implement techniques in accordance with aspects described in this disclosure.

FIG. 2B is a block diagram illustrating an example of the video decoder 30 that may implement techniques in accordance with aspects described in this disclosure. The video decoder 30 may be configured to perform some or all of the techniques of this disclosure. In some examples, the techniques described in this disclosure may be shared among the various components of the video decoder 30. In some examples, additionally or alternatively, a processor (not shown) may be configured to perform some or all of the techniques described in this disclosure.

For purposes of explanation, this disclosure describes the video decoder 30 in the context of DSC coding. However, the techniques of this disclosure may be applicable to other coding standards or methods.

In the example of FIG. 2B, the video decoder 30 includes a plurality of functional components. The functional components of the video decoder 30 include a rate buffer 155, a substream demultiplexor 160, an entropy decoder 165, a rate controller 170, a predictor, quantizer, and reconstructor component 175, an indexed color history 180, a line buffer 185, and a color-space converter 190. The illustrated components of the video decoder 30 are analogous to the corresponding components described above in connection with the video encoder 20 in FIG. 2A. As such, each of the components of the video decoder 30 may operate in a similar fashion to the corresponding components of the video encoder 20 as described above.

Slices in DSC

As noted above, a slice generally refers to a spatially distinct region in an image or a frame that can be decoded independently without using the information from the rest of the regions in the image or frame. Each image or video frame may be encoded in a single slice or each image or video frame may be encoded in several slices. In DSC, the target bits allocated to encode each slice may be substantially constant.

Quantization Parameter (QP)

As described above, video coding may include the quantization of the video data via, for example, the predictor, quantizer, and reconstructor component 125. Quantization may introduce loss into a signal and the amount of loss can be controlled by the QP determined by the rate controller 120. Rather than storing the quantization step size for each QP, a scaling matrix may be specified as a function of the QP. The quantization step size for each QP may be derived from the scaling matrix, and the derived value may not necessarily be a power of two, i.e., the derived value can also be a non-power of two.

Skip Mode

When all the values of a single color coordinate in a given block are zero, then the color coordinate value of the block can be effectively coded using skip mode. In certain implementations of skip mode coding, a 1-bit flag or a skip value may be signaled to the decoder to indicate whether the values of a color component of the current block are coded using skip mode (if all values of the color component of the current block are zero) or not in skip mode (if at least one of the values of the color component the current block is non-zero). In skip mode, when all of the values of a color component of the current block are zero, the 1-bit flag may be signaled to the decoder and the coder may refrain from coding the values of the color component of the block (i.e., the coding of the values of the color component of the block may be skipped). Skip mode may also be applied to a group of values of a color component having a size that is smaller than a block, or to a group of multiple blocks. Skip mode may also be applied separately for each color component of a block, for example, when all of the values of a color component of the current block are zero, skip mode may be applied to the values of the color component of the current block. In some implementations, skip mode may be applied to all of the color components of a group or block. As described in greater detail below, skip mode may also be applied to units that are smaller than a block.

Entropy Coding in DSC v1.0

As discussed above, in DSC v1.0, DSU-VLC has been proposed. In DSU-VLC, the residual values of each unit (a unit including samples of a color component of one group, where each group has 3 pixels) is coded using prefix and suffix parts. The prefix part indicates the size (for example, the number of bits) of the residual values that follow in the suffix part and the suffix part indicates the actual residual values of the three samples in the unit. All three residual values in the group are coded in two's complement using the same number of bits as indicated by the prefix part.

For the prefix part, instead of coding the actual size of the residual values of the current unit, the prefix values are predictive coded, where the size of the residual values of the current unit is predicted based on a size of residual values of a previous unit of the same component and also by considering the changes in the quantization parameters between the current unit and the previous unit. For example, let the values requiredSize[0], requiredSize[1] and requiredSize[2] respectively represent the required sizes of the quantized residual values of the previous group. From this, the predicted size can be calculated as:

predictedSize=(requiredSize[0]+requiredSize[1]+
2*requiredSize[2]+2)>>2

By considering the difference in the quantization parameter between the current unit and previous unit, the predicted size can be adjusted as:

adjPredictedSize=CLAMP(predictedSize−qLevel-
Change,0,maxSize−1)

Here, the value maxSize is the current color coordinate's maximum possible residual value and the CLAMP function is defined as:

CLAMP($X$,MIN,MAX)(($X$)>(MAX)!(MAX):(($X$)<
(MIN)!(MIN):($X$)).

Finally, the non-negative difference between the size of the residuals of the current unit and the predicted size can be unary coded. A negative difference is indicated by coding a zero value, for example, no change in the size of the residuals.

In this context, existing entropy coding techniques, such as Huffman, Arithmetic, Exponential-Golomb, Rice codes, etc. have a limited throughput of 1 sample/clock which may be too low for certain applications, e.g., high resolution displays and panels. That is, visually lossless entropy coding of video data for high resolution displays and panels, for example, 4K displays, using conventional hardware may not be economically feasible.

To overcome the above-described issues with existing approaches for DSC, this disclosure describes improvements below. In this disclosure, the following described techniques and approaches may be used solely or in any combination with one another.

In accordance with one or more aspects of the present disclosure, described herein is an entropy coding technique that provides a higher throughput (for example, 4 samples/clock). However, other throughput values can also be achieved based on the specific implementation.

Features of the entropy coding technique of the present disclosure, as compared to the DSU-VLC implemented in DSC v1.0, may include but are not limited to the following.

Coding of Quantized Block Residuals: The principles of skip and DSU-VLC coding may be combined in a way such that each group is DSU-VLC coded only if each group has at least one non-zero value.

Coding of Transform Coefficients: The quantized transform coefficients (for example, discreet cosine transform (DCT)) of each block may be coded by first constructing groups from the quantized transform coefficients and then coding each group using similar principles of DSU-VLC. Further, skip and DSU-VLC coding may be combined to code the quantized transform coefficients of each group.

Prefix Prediction: The size of the current group may, for example, be predicted based only on the maximum required size of the previous group. Further, while predicting the sizes, the entropy coding technique may monitor, consider, and/or factor in the effect of the QP, especially when the quantization step size is not a power of 2.

Prefix Coding: Both the negative and positive differences of the current size and the predicted size may be coded.

Further details regarding the above aspects are provided below. It is noted that the entropy coding technique described herein may, for example, be independently applied to code each color component in the block.

Coding of Quantized Block Residuals

FIG. 3 is a diagram illustrating a method of partitioning a block for a prediction coding mode, for example, block predication mode or differential pulse-code modulation (DPCM) mode, in accordance with aspects described in this disclosure. In the example of FIG. 3, the block includes sixteen samples 201 to 231, where each sample is, for example, a quantized residual. In one implementation, each component of the quantized residuals 201 to 231 in the block may, for example, be entropy coded according to the steps below. The diagram illustrated in FIG. 3 may also apply to reconstructing the block based on a plurality of partitioned groups for a prediction coding mode.

The samples 201 to 231 in the block may be partitioned into 4 groups as illustrated in the example of FIG. 3. However, the block may have an arbitrary number of samples which can be partitioned into an arbitrary number of groups. Further, the throughput of the entropy coding techniques described in this disclosure may be related to the number of groups in the block. Depending on the implementation, the samples 201 to 231 may be for example, 1D prediction residuals, and/or block-prediction residuals, and/or intra-prediction residuals, and/or 2D median adaptive predicted residuals. However, depending on the embodiment, the samples can represent any other type of residual.

Although a uniform grouping strategy is illustrated in the example of FIG. 3, in further related aspects, a non-uniform grouping strategy may be constructed, wherein the numbers of samples in each group are not the same.

In the following description, groups of samples are illustrated by being enclosed in braces. In the example illustrated in FIG. 3, groups 1, 2, 3, and 4 are constructed with the samples {201 to 207}, {209 to 215}, {217 to 223}, and {225 to 231}, respectively. In another example (not illustrated), groups 1, 2, 3, and 4 may be constructed with the samples {201 to 203}, {205 to 209}, {211 to 219}, and {221 to 231}, respectively. In yet another example (not illustrated), groups 1, 2, 3, and 4 may be constructed with the samples {201}, {203 to 207}, {209 to 217}, and {219 to 231}, respectively. In yet another example (not illustrated), groups 1, 2, 3, and 4 may be constructed with the samples {201}, {203 and 205}, {207 to 217}, and {219 to 231}, respectively. In yet another example (not illustrated), groups 1, 2, 3, and 4 may be constructed with the samples {201}, {203 to 209}, {211 to 219}, and {221 to 231}, respectively. However, the above-listed groupings of samples are merely examples and other methods of partitioning of the block into a plurality of groups can be performed.

Although the above description has illustrated and described a number of grouping techniques that may be used in partitioning a block, the reverse techniques may be applied when reconstructing the block. For example, when a block has been partitioned into four groups of samples as shown in FIG. 3, the block can be reconstructed to include the samples 201 to 231. This also applies to the other above-described grouping strategies that do not have the same number of samples in each group.

When all the samples associated with a particular color coordinate in the block have a value of zero, then those samples associated with that color coordinate of the block may be coded using skip mode, e.g., a 1-bit flag per block (per color coordinate) may be signaled to indicate if the current color coordinate in the block is encoded using skip mode or not. Accordingly, a 1-bit flag may be signaled for each color coordinate of the block to indicate whether the corresponding color coordinate of the block is coded using skip mode. In other implementations, a single 1-bit flag may be signaled for all of the color coordinates in the block. In the present disclosure, the encoding of the current color coordinate in the block via skip mode is referred to as block-wise skip mode.

For example, block-wise skip mode may not be applied to all three color coordinates. In one implementation, block-wise skip mode is applied for the chroma color coordinates but not for the luma color coordinates.

In some implementations, when at least one non-zero value is contained within one color coordinate in the block, then the entropy coding technique may involve coding each group using DSU-VLC only if the group has one non-zero value. For example, a 1-bit flag or a group skip value associated with a group may be signaled to indicate whether the group is encoded using skip mode or not. In the present disclosure, the encoding of each group via skip mode is referred to as group-wise skip mode. Similarly, the decoding of the 1-bit flag or the group skip value may also referred to as group-wise skip mode.

In some implementations, for each group, a search is carried out to determine whether all the values of the samples within the group are zero. In one example, when all the values in the group are zero, then a value (e.g., a value of '1') may be signaled to the decoder via the corresponding flag (e.g., the 1-bit flag referenced above) that indicates that all the values of the samples in the associated group equal zero. When at least one sample in the group has a non-zero value, then a value (e.g., a value of '0') may be signaled to the decoder via the corresponding flag, followed by the DSU-VLC coding of the group. In other words, the corresponding flag associated with the group may be signaled with a value that indicates that at least one sample within the group possesses a non-zero value. In another example, the value of '0' may be signaled when all the values of the samples within the group are zero and the value of '1' may be signaled when the group contains at least one sample with a non-zero value. However, depending on the embodiment, the signaling of whether group-wise skip mode has been employed for the current group can be signaled in any other suitable manner, for example, by signaling an indication of whether group-wise skip has been employed by the current-group via a plurality of bits.

Coding of Transform Coefficients

Figure 4:
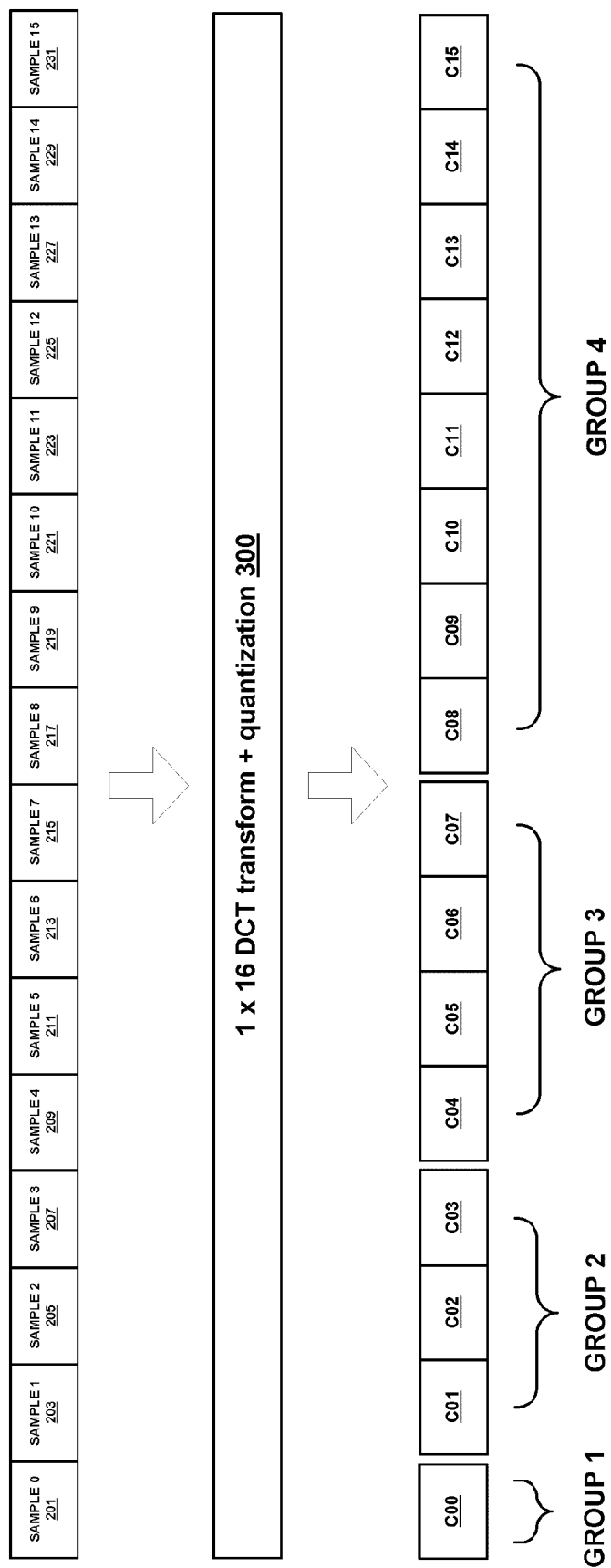
FIGS. 4-7 are diagrams illustrating methods of partitioning a block for a transform coefficient coding mode in accordance with aspects described in this disclosure.

FIGS. 4-7 are diagrams illustrating example techniques for partitioning a block for a transform coefficient coding mode in accordance with aspects described in this disclosure. In the example of FIG. 4, the block includes sixteen samples 201 to 231, where each sample is, for example, an intra prediction residual or a block prediction residual. A transformation can be applied to the samples 201 to 231 to obtain a plurality of transform coefficients C00 to C15. In one implementation, each component of the quantized transform coefficients in the block may, for example, be entropy coded according to the steps below. Although the diagrams illustrated in FIGS. 4-7 are generally described in terms of partitioning a block for a transform coding mode, the reverse procedure may also be performed in decoding the illustrated groups of transform coefficients.

The quantized transform coefficients in the block of a single component may be partitioned into N groups. In one example, N is 4 resulting in a block size of 1×16. The block may be transformed using a single 1×16 DCT-transform (element 300 of FIG. 4) or the block may be transformed using different transform size(s) such as, for example, a 1×8 DCT-transform or a 1×4 DCT-transform (see FIGS. 5-7). In each of these implementations, the construction of N=4 groups is illustrated below. However, in other embodiments, the number of groups N may be selected to be any suitable partitioning of the transform coefficients.

It is noted that the sixteen samples 201 to 231 in FIG. 4 may represent intra prediction residuals or block prediction residuals.

An embodiment of the partitioning of a block for a transform coefficient coding mode in accordance with aspects described in this disclosure is shown in FIG. 4. In the example of FIG. 4, four groups are constructed from the sixteen block samples 201 to 231, which are transformed using 1×16 DCT transform 300. In some implementations, the transform applied to the samples may be any suitable transform such as a Hadamard transform.

As shown in FIG. 4, the DCT transform generates a plurality of transform coefficients C00 to C15. In some implementations, the transform coefficients are ordered starting from the direct current (DC) coefficient, C00, which is the zero-frequency coefficient, to the highest frequency coefficient, C15. As shown in FIG. 4, the transform coefficients are partitioned, or grouped, into four groups. As used herein, the terms "partitioning" and "grouping" generally refer to a process of associating samples or transform coefficients together into groups and does not necessarily include physically separating the samples or transform coefficients. Unless stated otherwise, in the present disclosure, similar ordering may be used to represent the transform coefficients, where the first coefficient in group 1 represents the DC value, the last transform coefficient among the plurality of transform coefficients is associated with the highest frequency component, and the remaining transform coefficients are ordered from low to high (with respect to the associated frequency components) between the DC value and the highest frequency component. In the example of FIG. 4, group 1 includes the transform coefficient C00, group 2 includes the transform coefficients C01 to C03, group 3 includes the transform coefficients C04 to C07, and group 4 includes the transform coefficients C08 to C15. As such, frequency transform coefficients that are associated with frequency components that are "close" in value may be grouped together. For example, each group can be defined by including the transform coefficients that are representative of frequency components that fall within a frequency range associated with the corresponding group. The selection of which frequency components are grouped together (i.e., which transform coefficients are grouped together) may be selected based on various criteria, such as testing to determine the groupings that result in a higher efficiency coding.

Figure 5:
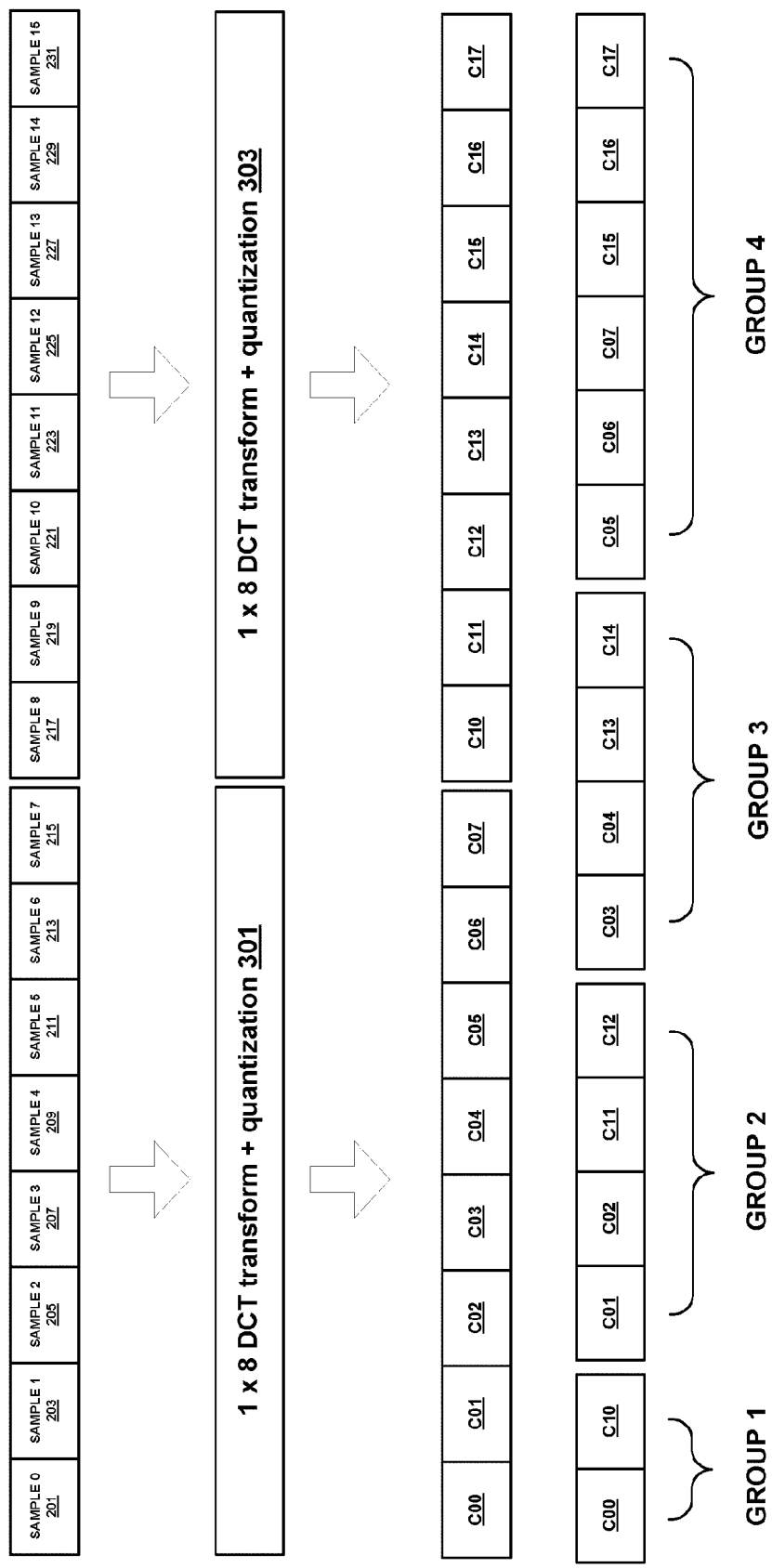

FIG. 5 is a diagram illustrating a partitioning (or grouping) of transform coefficients according to another example. In the example of FIG. 5, two 1×8 DCT transforms 301 and 303 are applied to the block samples 201 to 231. However, as discussed above, other types of transforms may be applied without departing from the aspects of this disclosure.

The first 1×8 DCT transform 301 generates a first plurality of transform coefficients C00 to C07 and the second 1×8 DCT transform 303 generates a second plurality of transform coefficients C10 to C17. The corresponding transform coefficients, in positional order, resulting from each 1×8 DCT transform may be associated with the same frequency component. For example, the transform coefficients C00 and C10 may both be DC coefficients and the transform coefficients C07 and C17 may be associated with the highest frequency components. In the example of FIG. 5, group 1 includes the transform coefficients C00 and C10, group 2 includes the transform coefficients C01, C02, C11, and C12, group 3 includes the transform coefficients C03, C04, C13 and C14, and group 4 includes the transform coefficients C05 to C07 and C15 to C17.

Figure 6:
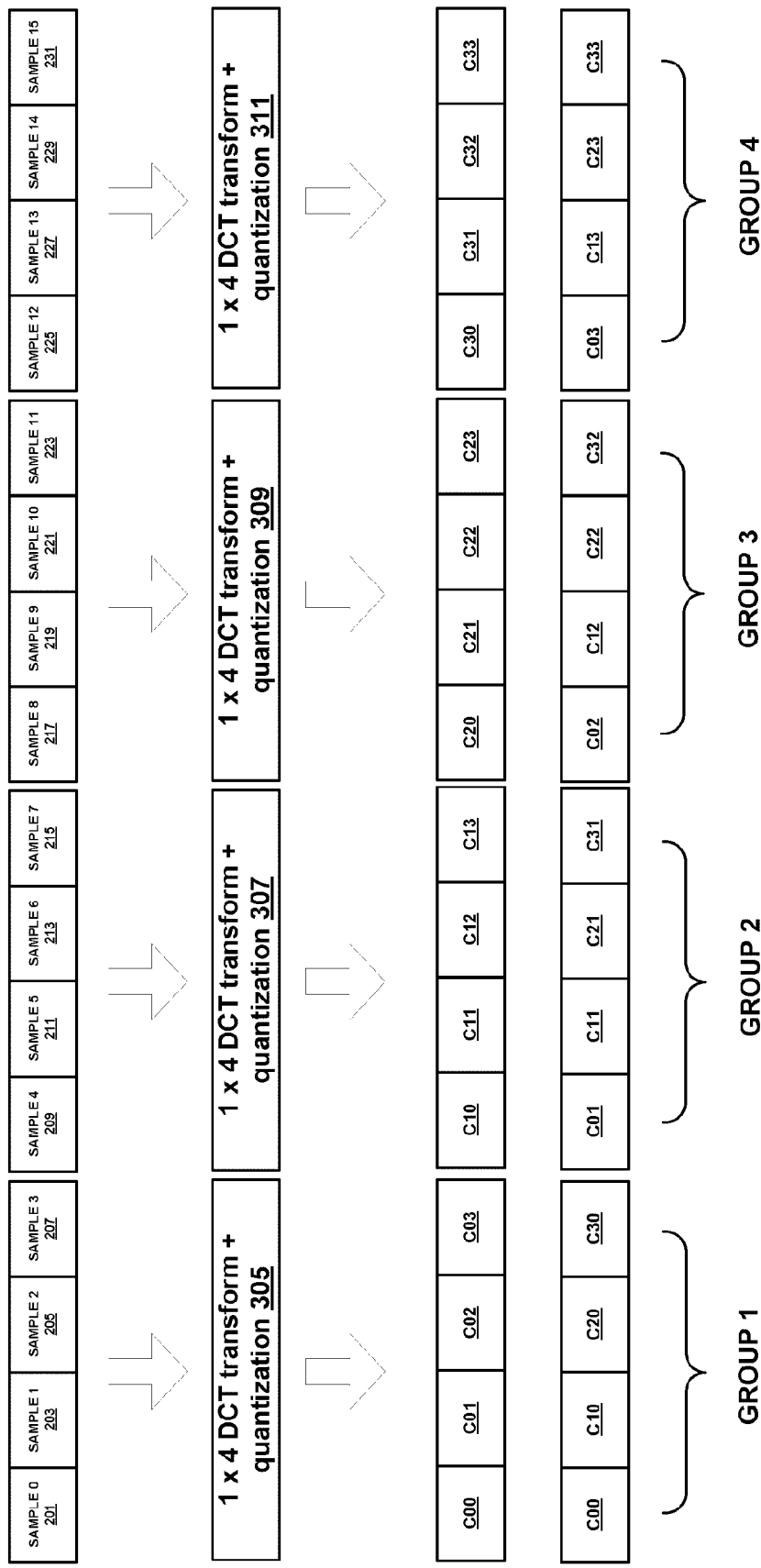

FIG. 6 is a diagram illustrating a partitioning of transform coefficients according to another example. In the example of FIG. 6, four 1×4 DCT transforms 305 to 311 are applied to the block samples 201 to 231. However, as discussed above, other types of transforms may be applied without departing from the aspects of this disclosure.

The first 1×4 DCT transform 305 generates a first plurality of transform coefficients C00 to C03, the second 1×4 DCT transform 307 generates a second plurality of transform coefficients C10 to C13, the third 1×4 DCT transform 309 generates a third plurality of transform coefficients C20 to C23, and the fourth 1×4 DCT transform 311 generates a fourth plurality of transform coefficients C30 to C33. The corresponding transform coefficients from each 1×4 DCT transform 305 to 311 can be associated with the same frequencies. For example, the transform coefficients C00, C10, C20, and C30 may be DC coefficients and the transform coefficients C03, C13, C23, and C33 may be associated with the highest frequency coefficients. In the example of FIG. 6, group 1 includes the transform coefficients C00, C10, C20, and C30, group 2 includes the transform coefficients C01, C11, C21, and C31, group 3 includes the transform coefficients C02, C12, C22, and C32, and group 4 includes the transform coefficients C03, C13, C23, and C33.

Figure 7:
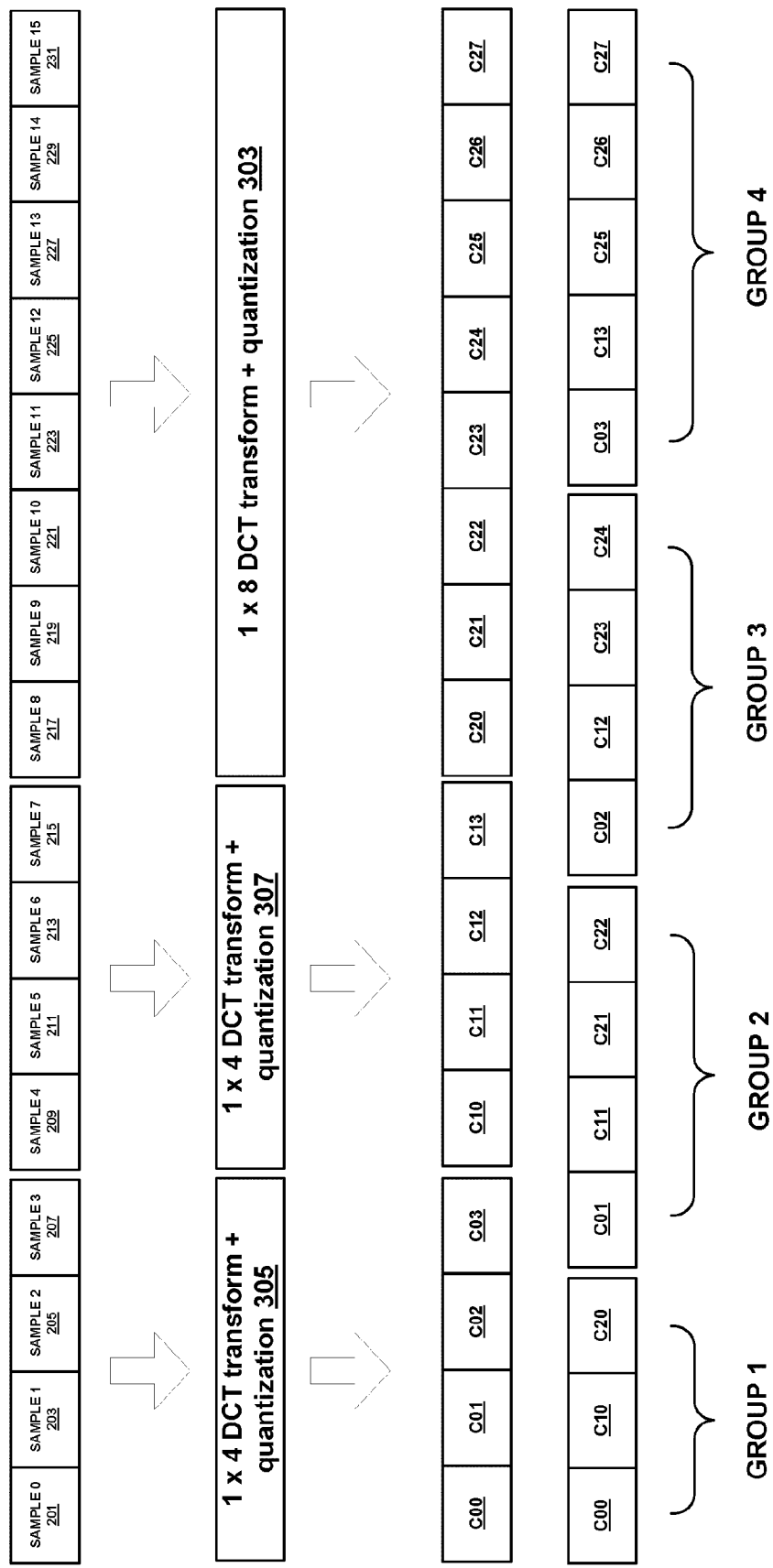

FIG. 7 is a diagram illustrating a partitioning or grouping of transform coefficients according to another example. In the example of FIG. 7, two 1×4 DCT transforms 305 and 307, as well as one 1×8 DCT transform 303, are applied to the block samples 201 to 231. However, as discussed above, other types of transforms may be applied without departing from the aspects of this disclosure.

The first 1×4 DCT transform 305 generates a first plurality of transform coefficients C00 to C03, the second 1×4 DCT transform 307 generates a second plurality of transform coefficients C10 to C13, and the 1×8 DCT transform 303 generates a third plurality of transform coefficients C20 to C27. The corresponding transform coefficients from each DCT transform 305 to 307 may have the same or similar frequencies. For example, the transform coefficients C00, C10, and C20 may be DC coefficients. In the example of FIG. 7, group 1 includes the transform coefficients C00, C10, and C20, group 2 includes the transform coefficients C01, C11, C21, and C22, group 3 includes the transform coefficients C02, C12, C23, and C24, and group 4 includes the transform coefficients C03, C13, C25, C26, and C27.

Although certain examples have been described in connection with FIGS. 5-7, other transforms and partitioning of the transform coefficients can also be implemented. For example, 1×8, 1×4, and 1×4 transforms may be applied in order, such as, [8 4 4], or 1×4, 1×8, and 1×4 transforms may be applied in order, such as, [4 8 4]. Further, the groups may be constructed using a methodology similar to the example of FIG. 7.

In other implementations, linear grouping methods may be used to construct the four groups, where each group can have 4 transform coefficients per group. For example, in an alternative to the example of FIG. 4, after the application of the 1×16 DCT transform 200, group 1 may contain the first four transform coefficients C0 to C3, group 2 may contain next four transform coefficients C4 to C7, etc. In an alternative to the example of FIG. 5, after the application of the 1×8 DCT transforms 301 and 303, each group may be constructed by taking two coefficients from each set of transform coefficients C00 to C07 and C10 to C17. For example, group 1 may contain C00, C10, C01, and C11, group 2 may contain C02, C03, C12, and C13, etc. In an alternative to the example of FIG. 7, after the application of the 1×4 DCT transforms 305 and 307, as well as the 1×8 DCT transform 303, each group may be constructed by taking one coefficient each from the two sets of transform coefficients C00 to C03 and C10 to C13 and 2 coefficients from the set of transform coefficients C20 to C27. For example, group 1 may contain C00, C10, C20, and C21, group 2 may contain C01, C11, C22, and C23, etc. Similar grouping strategies may be implemented to construct groups of other partitioning transform choices, such as, for example, [8 4 4], [4 8 4], etc.

While a number of grouping techniques for encoding have been described in connection with FIGS. 4-7, the decoding of the groups may be performed in the reverse order of the encoding techniques described with reference to FIGS. 4-7. For example, the groups of transform coefficients may be reorganized based on the number of transforms applied to the samples 201 to 231 and the same number of inverse transforms may be applied to the reorganized transform coefficients. The reorganization may be based on, for example, the number of transform coefficients in each group or a signaling of the type and number of transforms applied to generate the transform coefficients.

In some implementations, after the grouping construction, the index of the group that contains at least one non-zero value may be found in the reverse scan order, for example, the search progresses through groups 4, 3, 2, and 1, in order. The index of the group that contains at least one non-zero value (which may also be referred to as a "significant" group) may be signaled to the decoder. In one example, the index may be signaled using a 2-bit fixed length code. In another example, variable length codes (VLCs), such as Huffman or structured VLC codes such as Exponential Golomb or Rice codes may be used.

The remaining groups (including the group that has one non-zero value) may be coded using DSU-VLC using prefix and suffix parts, where the prefix indicates the size of the suffix that follows. In the suffix part, the coefficients in the groups may, for example, be coded using the same number of bits.

In another approach, alternative or in addition to approaches to the above, the groups may be coded using group-wise skip mode, where a skip flag or skip value is signaled for each group, and each group is DSU-VLC coded only if the group has at least one non-zero value.

In yet another approach, a combination of one or more of the above approaches may be combined with a block-wise skip mode, where the techniques explained above may be applied only if at least one of the sixteen coefficients C00 to C15 contains a non-zero value.

In one example, block-wise skip mode is not applied to all the three color coordinates. In another example, block-wise skip mode is applied only to the chroma color coordinates but not to the luma color coordinate.

In still another approach, before applying the steps above, the last significant transform coefficient position (e.g., the position where the absolute value of the transform coefficient is greater than or equal to 1) is identified first. The position information may be explicitly signaled to the decoder. Furthermore, the absolute value of the last significant position may be subtracted by 1. For example, let C represent the magnitude of the coefficient value corresponding to the last significant position. The coefficient may be replaced by $C_{new}=(|C|-1)*sign(C)$, where sign(C) represents the sign value of coefficient C. The sign information sign(C) corresponding to the last significant position may be signaled. Then, all the samples, starting from the first coefficient to the last significant coefficient position (inclusive) may be coded using group-wise skip mode. Thereafter, if at least one of the samples within the group is non-zero, then the group may be DSU-VLC coded. If none of the samples within the group is non-zero, then the group may be coded using group-wise skip mode. It is noted that when the last significant coefficient position does not overlap with the group boundary, only the subset of samples within the group until the last significant coefficient position are coded, whereas the remaining samples (having a value of zero) are not coded. At decoder, the remaining samples (having a value of zero) may be inferred directly from the last significant coefficient position.

In one example, the sign information corresponding to the last significant position may be signaled only when the absolute value of the last significant coefficient value subtracted by 1 is equal to zero, i.e., $|C|-1==0$, where C represents the magnitude of the coefficient value corresponding to the last significant position. The coefficients may be coded using 2's complement, for example, N-bits can be used to represent the values in $-(2^{N-1})$ to $+(2^{N-1}-1)$.

In one aspect, the last significant position may be coded using a fixed length code, where the number of bits is set equal to log 2 (numberOfSamplesInBlock).

In another aspect, the last significant position may be coded using variable length codes, such as, for example, Exp-Golomb code, Huffman code, a mixture of Rice and Exp-Golomb codes, etc. In yet another aspect, block-wise skip mode described above may be applied before applying the techniques of using variable length codes to code the last significant position.

In yet another approach, block-wise skip mode is not applied before applying the technique of using variable length codes to code the last significant position. In scenarios when all the samples in the block are zero, a default value of last significant position may be signaled to the decoder.

In one example, the default last significant position is zero that represents the first sample position in group 1. After signaling the default last significant position (of zero), if all the samples in the block are zero, group 1 may be coded using group-wise skip mode. On the other hand, if the value at the default last significant position is non-zero, then the first sample in group 1 may be coded using DSU-VLC coding principles.

In another example, the absolute value corresponding to the default last significant position is not subtracted by 1. As the coefficient value is not subtracted by 1, the sign information corresponding to the default last significant position is not signaled.

In yet another example, the absolute value corresponding to the default last significant position may be subtracted by 1. There may be, for example, two cases: (i) there is a non-zero value at the default last significant position; and (ii) the value at default position is zero. As the last significant coefficient value is subtracted by 1, the sign information corresponding to the default last significant position may be signaled when |C|−1==0, where C represents the magnitude of the coefficient value corresponding to the last significant position.

It is noted that in scenarios where the last significant position is not the same as the default position (zero), the technique(s) of using variable length codes to code the last significant position may be applied.

Prefix Prediction

In one implementation, the prefix values of each component may be predicted as described below.

The values prevBits and currBits, may represent the number of bits required to code the previous group and the current group, respectively (e.g., the prefix value of previous group and the prefix value of the current group, respectively). The values prevQP and currQP may represent the quantization parameter used to code the previous group (is the previous group not being coded in skip mode) and the current group, respectively.

The value prevBits may be adjusted (denoted here as the value adjPrevBits) based on the difference between the values currQP and prevQP, as follows:

delSize=|cur$Qp$−prev$Qp$|>>$k$ delSize=(cur$Qp$>prev$Qp$)!−delSize:delSize adjPrevBits=prevBits+delSize adjPrevBits=Max(1,adjPrevBits)

Here, k may be any positive integer. In one example, k is equal to 3.

In another example, the value prevBits is not adjusted based on the difference between the values currQP and prevQP, i.e., the value prevBits is used for prefix prediction without any adjustment.

While coding the transform coefficients, the current group prefix value (for example, the value currBits) may be predicted based on the prefix value of the same group index (and same component) of a block that is previously coded using transform mode. That is, the value currBits from group i, i∈{1, 2, 3, 4} may be predicted based on the prefix value (and the respective quantization parameter) of the respective group i, i∈{1, 2, 3, 4} in the previously coded transform block. If the respective color component in the previous block is coded using block-wise skip mode, then the last occurrence of transform block with same color component that is not coded using block-wise skip mode can be considered for prediction. If a particular group i in the previous block is coded in group-wise skip mode, then the value prevBits=1 and/or the value adjPrevBits=1 may be used.

In prefix prediction, the prefix value of the previous block that is coded using the same mode as of the current block can be used. In one example, if the current block directly codes the residuals without using the transform, then the prefix value and quantization parameter of the previous block that is not coded using transform (neither using block-wise mode) may be considered for prediction. In particular, among the four prefix values one for each group with in the block, the prefix value corresponding to the last occurrence of the group that is not coded using group-wise skip mode can be used for prediction.

In another example, a separate prefix prediction function can be maintained for each coding mode, for example, if the current block is coded after applying a transform, then the prefix value associated with the previous occurrence of a block that is coded with the transform is used for prediction. In a similar manner, if the current block residuals represent residuals generated from block-prediction, then the prefix value associated with the previous occurrence of a block that contains block-prediction residuals is used.

In yet another example, prefix prediction function can be shared across the modes, in such a way that one function is maintained for the blocks coded with transform and another function may be maintained for the blocks that represents the residuals, for example, 1D prediction residuals, and/or block-prediction residuals, and/or intra-prediction residuals, and/or 2D median adaptive predicted residuals.

In still another example, the prefix values of all the groups in the current block may be predicted based on a single prefix value in the previously coded block. The single prefix value may be associated with any of 4 groups. In one approach, the single prefix value may be associated with the last group, e.g., i=4 in the previous block. If the last group in the previous block is coded using group-wise skip mode, then the prefix value associated with a group i−1 that is not coded using group-wise skip mode is used. In another approach, if the last group or any particular group is coded using group-wise skip mode, prevBits=1 and/or adjPrevBits=1 is used.

In scenarios where a previous block with the same coding mode as of the current block could not be identified, the prediction may be based on the default value of the value prevBits=1 and/or the value adjPrevBits=1, together with the quantization parameter set equal to the default initial value of the encoder.

Prefix Coding

In one implementation of prefix coding, for each component, the absolute difference between the value currBits and the value adjPrevBits may be coded using unary coding and the sign may be indicted by an additional 1-bit. It is noted that the sign bit may, for example, be signalled only when the absolute difference is strictly greater than zero.

In another implementation, for each component, the absolute difference between the value currBits and the value prevBits can be coded using unary coding and the sign may be indicated by an additional 1-bit.

In yet another implementation, for each component, the value currBits may be coded using unary codes without any prediction.

In still another implementation, for each component, the value currBits−1 may be coded using unary codes without any prediction.

In another implementation, instead of directly coding the prefix value (for example, the value currBits−1), the prefix value may be mapped to a value (for example, using a mapping function or table) and the mapped value may be coded. The table/function may be designed in a way that the average expected code length is small (for example, less than a defined code length value). The coding of the prefix value may be done by sorting a prefix value (for example, the value currBits−1) in descending order and assigning a specific value such that the most probable prefix values are mapped to a value whose code length is small and the least probable prefix values are mapped to a value whose code length is large (for example, equal to or greater than a defined code length value).

In yet another implementation, instead of unary codes, VLCs, such as, for example, Huffman or structured VLC codes such as Exponential Golomb, Rice codes, may be used.

In still another implementation, fixed length codes can be used for prefix coding.

Extensions to 2D Blocks

In this subsection, the extension of the entropy coding to 2D block sizes P×Q is disclosed, wherein P and Q respectively represent the block height and block width.

Regarding the coding of quantized block residuals, quantized block residuals in general refer to the residuals generated by subtracting a predicted block from an original block and applying quantization on top of the residual block. The prediction can be carried out from the spatially neighboring samples. Examples of spatial prediction include block prediction, median adaptive prediction (MAP), intra prediction, and/or midpoint prediction. It is noted that a transform is not applied for the coding of quantized block residuals.

Each component of the quantized block residuals of the 2D block P×Q may be partitioned into N groups, where N is a positive integer. In one example, N is set to 4.

The groups can be formed such that each quantized residual sample belongs to one and only one group.

The number of samples in each group may be equal, for example, each group may have (P×Q)/N samples. The groups may be constructed by partitioning the block P×Q into (P×Q)/N partitions and the samples in each partition can be considered as one group. In one example, the partitioning can be carried out only in the vertical direction, for example, each partition size is P×(Q/N). In another example, the partitioning can be done only in the horizontal direction, wherein each partition size (P/N)×Q. In another example, the partitioning can be done in both vertical and horizontal directions. As an example, each partition size can be (P/(N/2))×(Q/(N/2)).

In another example, the number of samples in each group is not equal, wherein partitioning into sub blocks may be carried out in non-uniform fashion.

After constructing the groups, the groups can be coded using the technique(s) described above in the section regarding "Coding of Quantized Block Residuals".

Regarding the coding of quantized transform coefficients, each component of the quantized transform coefficients of the 2D block of size P×Q may be partitioned into N groups, where N is a positive integer. In one example, N is set to 4.

The groups may be formed such that each quantized coefficient sample belongs to only one group.

The number of samples in each group may be unequal. The quantized transform coefficients that represent similar frequencies may form one group.

FIG. 8 is a diagram illustrating another example technique for partitioning a block for a transform coefficient coding mode, in accordance with aspects of this disclosure. FIG. 8 illustrates an example of partitioning a 2D block of samples into groups when the block size is 4×4. In FIG. 8, P=4 and Q=4 and the number of groups N=4. For example, a first shading represents to a first group that includes the transform coefficient C00. A second shading represents a second group that includes C01, C02, C04, and C08. A third shading represents a third group that includes C05, C06, C09, and C10. A fourth shading represents a fourth group that includes C03, C07, C11, C12, C13, C14, and C15.

It is noted that the grouping construction shown in FIG. 8 is merely an example which illustrates aspects of the techniques described herein, and there are numerous other ways to construct groups for a given block of size P×Q.

In another approach, the coefficients may be scanned in a particular scan order, and the resulting 1D coefficient scan can be partitioned into N groups. For example, the scanning may be performed in zig-zag order. In another example, vertical and/or horizontal scan order(s) may be used.

When transform partitioning is applied (for example, a transform is applied for each sub-block within the block), the transform coefficients that represent similar frequencies across different partitions may be included in the same group. For example, the DC value corresponding to the different partitions within the block may be considered for forming a first group.

In another approach, the number of samples in each group may be equal and the groups may be constructed using the technique(s) described above the section regarding "Coding of Quantized Block Residuals".

After constructing the groups, the groups may be coded using the technique(s) described above in the section with the heading "Coding of Transform Coefficients".

An implementation of a technique is described below for constructing groups according to another exemplary approach.

For illustrative purposes, the block size may be P×Q with P=2 and Q=8, and the number of groups N=4. Here, P, Q, and N may be defined as described above.

Figure 9:
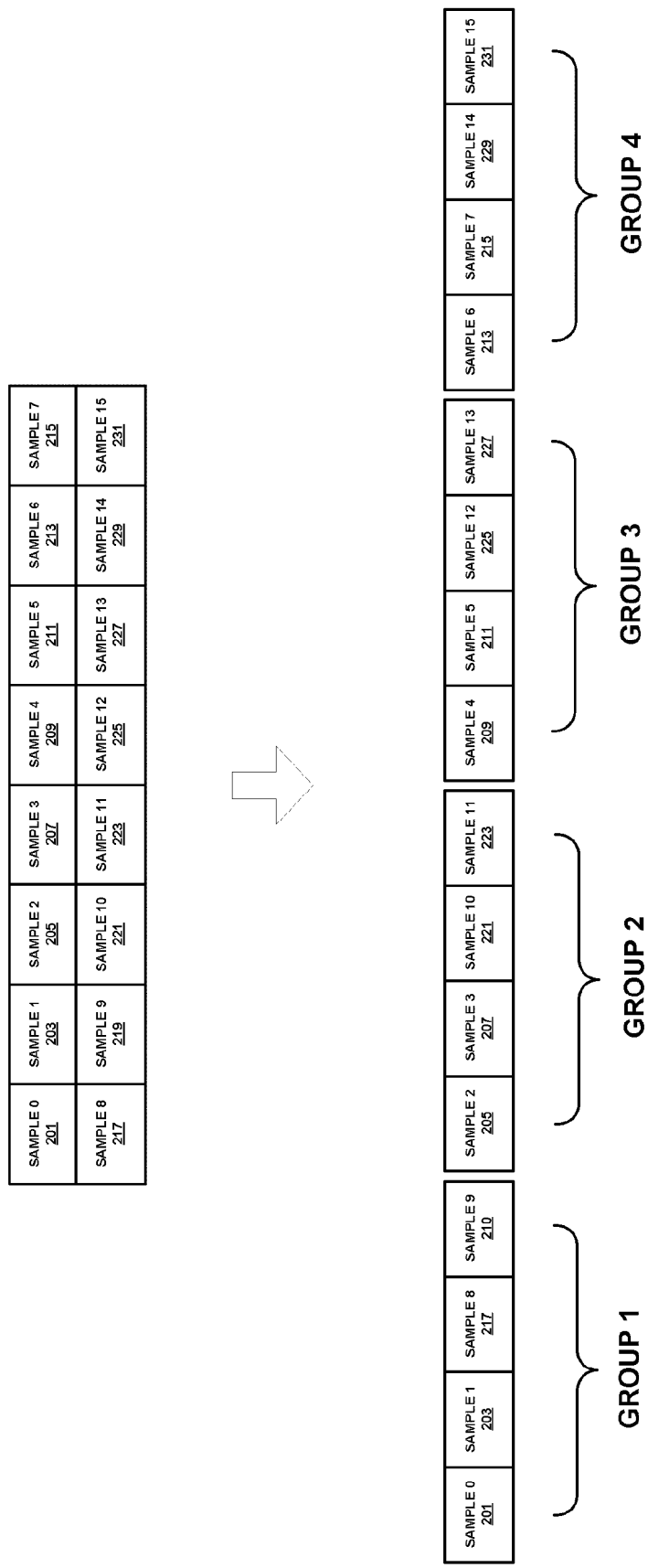
FIG. 9-11 are diagrams illustrating methods of partitioning a block in accordance with aspects described in this disclosure.
Figure 10:
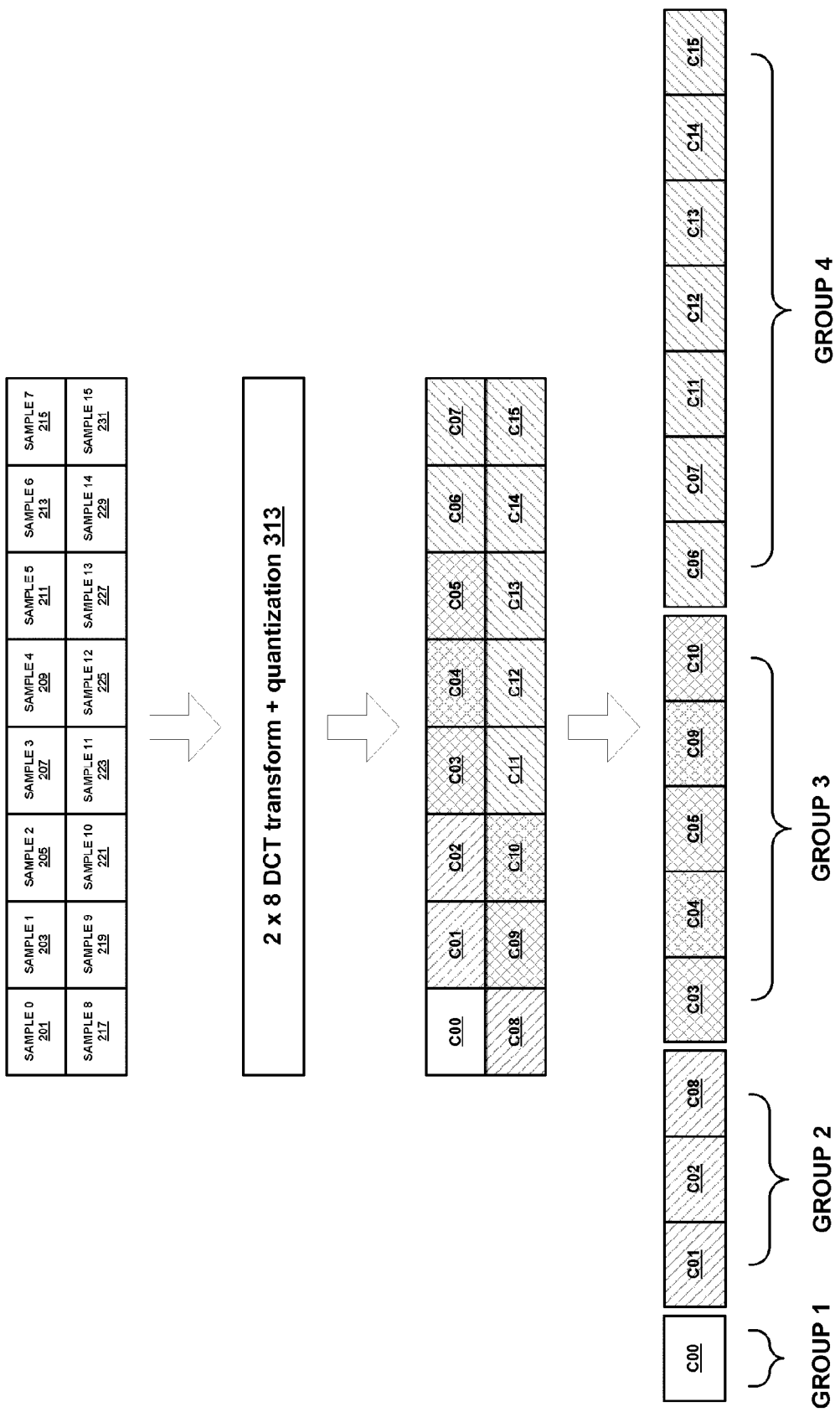
Figure 11:
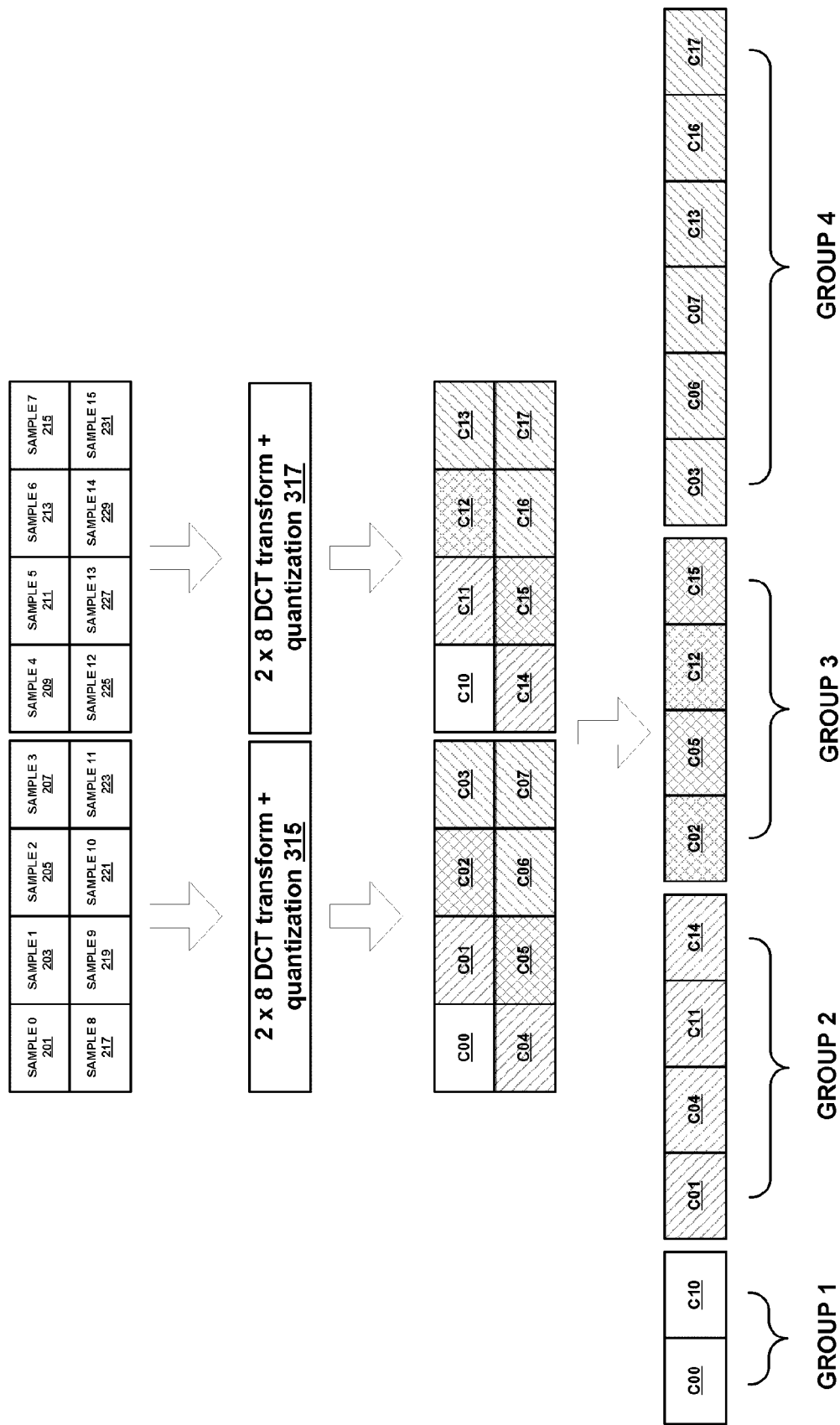

FIGS. 9-11 are diagrams illustrating methods of partitioning a block in accordance with aspects described in this disclosure.

As described in the section above with the heading "Coding of Quantized Block Residuals", the grouping of quantized block residuals may be done via partitioning the blocks vertically, where each sub-block size of 2×2 is considered as one group as shown in FIG. 9. It is noted that a transform is not applied in this embodiment.

As described in the section above with the heading "Coding of Quantized Transform Coefficients", the grouping of quantized transform coefficients of a block of size 2×8 may be constructed as shown in FIG. 10. In the example of FIG. 10, a 2×8 transform 313 is applied.

When transform partitioning is applied (e.g., when two 2×4 transforms 315 and 317 are applied for a block size of 2×8), groups may be constructed as shown in FIG. 11.

Example Flowchart for Entropy Encoding

Figure 12:
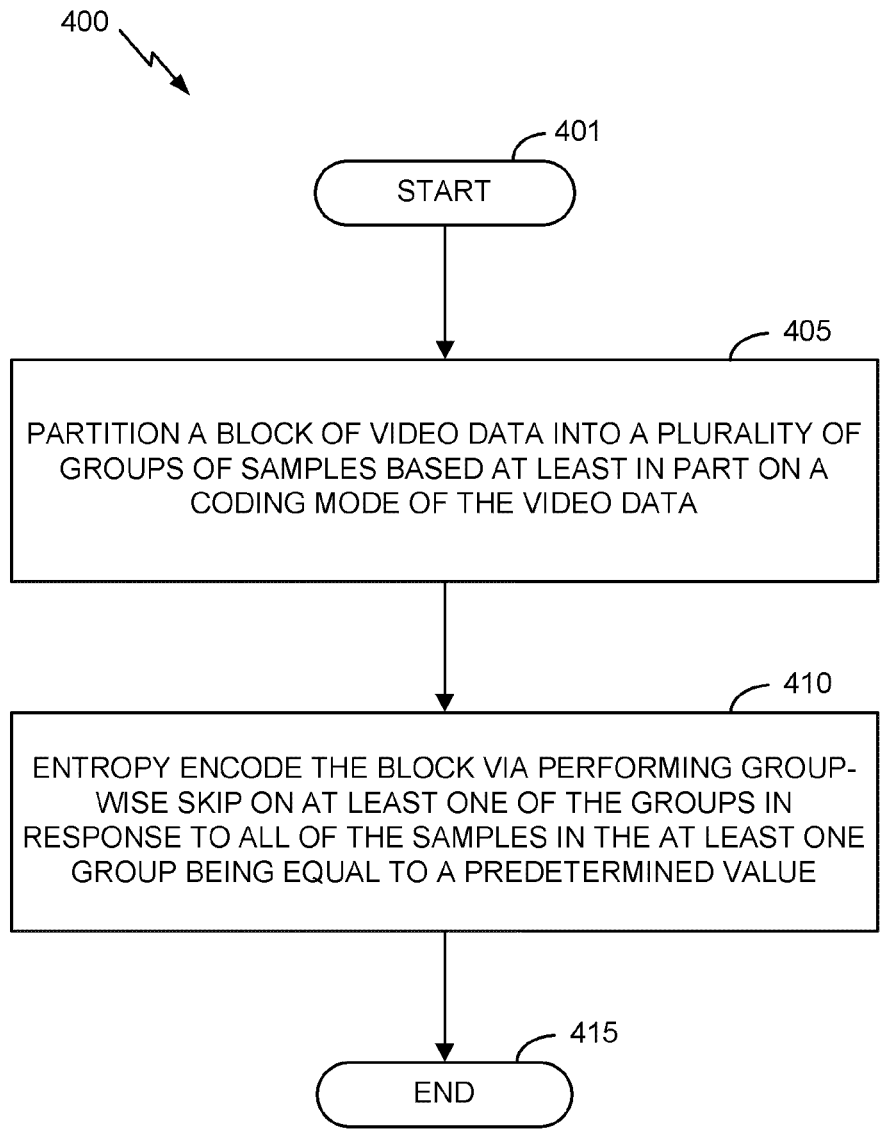
FIG. 12 is a flowchart illustrating a method for entropy encoding video data in accordance with aspects described in this disclosure.

With reference to FIG. 12, an example procedure for entropy encoding will be described. FIG. 12 is a flowchart illustrating a method 400 for encoding video data, according to an embodiment of the present disclosure. The steps illustrated in FIG. 12 may be performed by a video encoder (e.g., the video encoder 20 in FIG. 2A) or component(s) thereof. For convenience, method 400 is described as performed by a video coder (also simply referred to as coder), which may be the video encoder 20 or another component.

The method 400 begins at block 401. At block 405, the coder partitions (or groups) a block of the video data into a plurality of groups of samples based at least in part on a coding mode of the video data. For example, the coding mode of the video data may be a quantized block residual coding mode, a transform coefficient coding mode or another coding mode. Additionally, the samples of the block of video data may include a plurality of color coordinates, and the samples of each color coordinate may be partitioned into a plurality of groups of samples based at least in part on a coding mode of the color coordinate.

At block 410, the coder entropy encodes the block via performing a group-wise skip on at least one of the groups in response to all of the samples in the at least one group being equal to a predetermined value. The group-wise skip may comprise refraining from encoding the samples in the at least one group. In some implementations, block is coded using DSU-VLC coding. The method ends at block 415.

In the method 400, one or more of the blocks shown in FIG. 12 may be removed (e.g., not performed) and/or the order in which the method is performed may be switched. In some embodiments, additional blocks may be added to the method 400. The embodiments of the present disclosure are not limited to or by the example shown in FIG. 12, and other variations may be implemented without departing from the spirit of this disclosure.

Example Flowchart for Entropy Decoding

Figure 13:
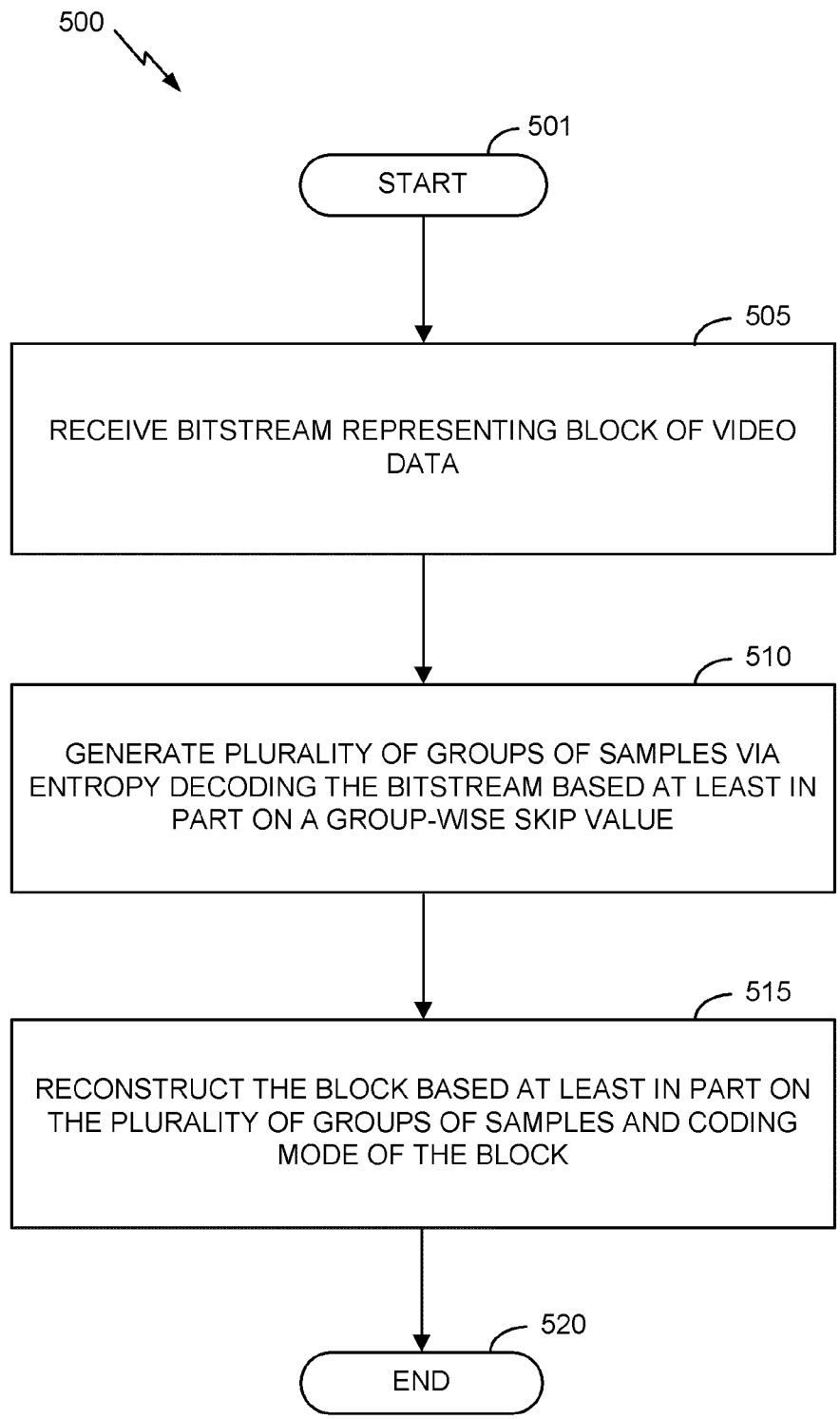
FIG. 13 is a flowchart illustrating a method for entropy decoding video data in accordance with aspects described in this disclosure.

With reference to FIG. 13, an example procedure for entropy decoding will be described. FIG. 13 is a flowchart illustrating a method 500 for decoding video data, according to an embodiment of the present disclosure. The steps illustrated in FIG. 13 may be performed by a video decoder (e.g., the video decoder 30 in FIG. 2B) or component(s) thereof. For convenience, method 500 is described as performed by a video coder (also simply referred to as coder), which may be the video decoder 30 or another component.

The method 500 begins at block 501. At block 505, the coder receives a bitstream representing a block of the video data. The block may include a plurality of groups of samples. The bitstream may include at least one group-wise skip value indicating that a corresponding group of samples of the block is not included in the bitstream.

At block 510, the coder generates the plurality of groups of samples via entropy decoding the bitstream based at least in part on the group-wise skip value. At block 515, the coder reconstructs the block based at least in part on the plurality of groups of samples and a coding mode of the block. For example, the coding mode of the video data may be a quantized block residual coding mode, a transform coefficient coding mode or another coding mode. Additionally, the samples of the block of video data may include a plurality of color coordinates, and the samples of each color coordinate may be partitioned into a plurality of groups of samples based at least in part on a coding mode of the color coordinate. The method 500 ends at block 520.

In the method 500, one or more of the blocks shown in FIG. 13 may be removed (e.g., not performed) and/or the order in which the method is performed may be switched. In some embodiments, additional blocks may be added to the method 500. The embodiments of the present disclosure are not limited to or by the example shown in FIG. 13, and other variations may be implemented without departing from the spirit of this disclosure.

Other Considerations

It should be noted that aspects of this disclosure have been described from the perspective of an encoder, such as the video encoder 20 in FIG. 2A. However, those skilled in the art will appreciate that the reverse operations to those described above may be applied to decode the generated bitstream by, for example, the video decoder 30 in FIG. 2B.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, and algorithm steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may be implemented in hardware, software, firmware, or any combination thereof. Such techniques may be implemented in any of a variety of devices such as general purposes computers, wireless communication device handsets, or integrated circuit devices having multiple uses including applications in wireless communication device handsets, automotive, appliances, wearables, and/or other devices. Any features described as devices or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software or hardware configured for encoding and decoding, or incorporated in a combined video encoder-decoder (CO- DEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Although the foregoing has been described in connection with various different embodiments, features or elements from one embodiment may be combined with other embodiments without departing from the teachings of this disclosure. However, the combinations of features between the respective embodiments are not necessarily limited thereto. Various embodiments of the disclosure have been described. These and other embodiments are within the scope of the following claims.

What is claimed is:

1. A method of entropy encoding video data, comprising:
   selecting a first coding mode for a first block of the video data from a plurality of coding modes;
   selecting a second coding mode for a second block of the video data from the plurality of coding modes;
   in response to the selected coding mode for the first block being the first coding mode, partitioning the first block of the video data into a first plurality of groups of samples based at least in part on a coding mode of the block via a first partitioning technique;
   in response to the selected coding mode for the second block being the second coding mode, partitioning the second block of the video data into samples into a second plurality of groups of samples via a second partitioning technique, wherein the first partitioning technique and the second partitioning technique are different; and
   for each of the first and second blocks:
   skipping encoding samples in one of the plurality of groups of samples of the first or second block in response to all of the samples in the one group having a value equal to a predetermined value, and
   coding each of the remaining groups of the plurality of groups of samples of the first or second block using a suffix indicating values of samples of a corresponding remaining group and a prefix indicating a size of the suffix in response to at least one of the samples in the corresponding remaining group having a value that is not equal to the predetermined value.

2. The method of claim 1, wherein the samples of the block each of the first and second blocks include a plurality of color coordinates, wherein the partitioning of the block of the video data comprises:
   separating the samples of the first or second block based at least in part on their color coordinates; and
   for each color coordinate, partitioning the samples of the first or second block having the same color coordinate into the plurality of groups of samples.

3. The method of claim 2, wherein the partitioning of each of the first and second blocks further comprises, for each color coordinate, partitioning the first or second block into the plurality of groups having the same number of samples in response to the first or second coding mode of the first or second block being a block prediction mode or a differential pulse-code modulation (DPCM) mode.

4. The method of claim 3, wherein the entropy encoding of the first or second block further comprises performing a block-wise skip on the samples having the same color coordinate in the first or second block in response to all of the samples associated with the same color coordinate in the first or second block having a value equal to the predetermined value, the block-wise skip comprising refraining from encoding the samples associated with the same color coordinate in the first or second block.

5. The method of claim 2, wherein the partitioning of the first block further comprises, for each color coordinate, partitioning the block into a first group and a second group in response to the first coding mode of the first block being a transform mode, the first and second groups having different numbers of samples.

6. The method of claim 5, further comprising:
   generating the plurality of samples via applying at least one transform to the first block, each of the samples representing a different frequency coefficient associated with a corresponding frequency; and
   forming each first group by collecting samples associated with frequencies that are within a corresponding frequency range.

7. The method of claim 6, wherein a group of samples associated with the lowest frequencies includes fewer samples than a group of samples associated with the highest frequencies.

8. The method of claim 6, further comprising:
   ordering the samples based on the associated frequencies from lowest to highest frequency;
   determining a sample associated with the highest frequency that is not equal to a predetermined value; and
   signaling a position of the sample associated with the highest frequency that is not equal to the predetermined value.

9. The method of claim 8, further comprising adjusting the value of the sample associated with highest frequency that is not equal to the predetermined value via the following equation:

$$C_{new}=(|C|-1)*\text{sign}(C),$$

where $C_{new}$ is the adjusted value, C is the value of the sample associated with highest frequency that is not equal to the predetermined value, and sign(C) is the sign value of the sample associated with highest frequency that is not equal to the predetermined value.

10. The method of claim 9, further comprising signaling the sign value of the sample associated with highest frequency that is not equal to the predetermined value when the adjusted value $C_{new}$ is equal to zero.

11. A device for entropy encoding video data, comprising:
    a memory configured to store the video data; and
    a processor in communication with the memory and configured to:
    select a coding mode for a block of the video data from a plurality of coding modes;
    in response to the selected coding mode being a first coding mode, partition the block of the video data into a plurality of groups of samples via a first partitioning technique;
    in response to the selected coding mode being a second coding mode, partition the samples into the plurality of groups of samples via a second partitioning technique;

skip encoding samples in one of the plurality of groups of samples in response to all of the samples in the one group having a value equal to a predetermined value; and code each of the remaining groups of the plurality of groups of samples using a suffix indicating values of samples of a corresponding remaining group and a prefix indicating a size of the suffix in response to at least one of the samples in the corresponding remaining group having a value that is not equal to the predetermined value.

12. The device of claim 11, wherein the samples of the block include a plurality of color coordinates, wherein the processor is further configured to:

separate the samples of the block based at least in part on their color coordinates; and for each color coordinate, partition the samples of the block having the same color coordinate into the plurality of groups of samples.

13. The device of claim 11, wherein the processor is further configured to, for each color coordinate, partition the block into the plurality of groups having the same number of samples in response to the coding mode of the block being a block prediction mode or a differential pulse-code modulation (DPCM) mode.

14. The device of claim 13, wherein the processor is further configured to perform a block-wise skip on the samples having the same color coordinate in the block in response to all of the samples associated with the same color coordinate in the block having a value equal to the predetermined value, the block-wise skip comprising signaling a block-wise skip value and refraining from encoding the samples associated with the same color coordinate in the block.

15. The device of claim 12, wherein the processor is further configured to, for each color coordinate, partition the block into a first group and a second group in response to the coding mode of the block being a transform mode, the first and second groups having different numbers of samples.

16. The device of claim 15, wherein the processor is further configured to:

generate the plurality of samples via applying at least one transform to the block, each of the samples representing a different frequency coefficient associated with a corresponding frequency; and form each group by collecting samples associated with frequencies that are within a corresponding frequency range.

17. The device of claim 16, wherein a group of samples associated with the lowest frequencies includes fewer samples than a group of samples associated with the highest frequencies.

18. The device of claim 16, wherein the processor is further configured to:

order the samples based on the associated frequencies from lowest to highest frequency;

determine a sample associated with the highest frequency that is not equal to a predetermined value; and signal a position of the sample associated with the highest frequency that is not equal to the predetermined value.

19. A method of entropy decoding video data, comprising:

receiving a bitstream representing first and second blocks of the video data, the first block comprising a first plurality of groups of samples and the second block comprising a second plurality of groups of samples, the bitstream including one group-wise skip value indicating that a corresponding group of samples of the first or second block is not included in the bitstream;

generating the first and second plurality of groups of samples via entropy decoding the bitstream based at least in part on the group-wise skip value;

determining that the first plurality of groups of samples is encoded via a first coding mode and the second plurality of groups of samples is encoded via a second coding mode;

in response to the coding mode for the first plurality of groups of samples being the first coding mode, grouping the first plurality of groups of samples into the first block using a first grouping technique;

in response to the coding mode for the second plurality of groups of samples being the second coding mode, grouping the second plurality of groups of samples into the second block using a second grouping technique, wherein the first grouping technique and the second grouping technique are different.

20. The method of claim 19, wherein the samples of the block include a plurality of color coordinates, the method further comprising:

grouping the plurality of groups of samples based at least in part on their color coordinates; and reconstructing the block via combining the plurality of groups of samples.

21. The method of claim 19, further comprising applying at least one reverse transform to the samples in response to the coding mode of the block being a transform mode, a first group of the plurality of groups of samples having a different number of samples from a second group of the plurality of groups of samples.

22. The method of claim 19, further comprising generating each of the samples in the group of samples corresponding to the group-wise skip value to have a predetermined value.

23. The method of claim 22, further comprising:

receiving a position of a sample associated with a highest frequency that is not equal to the predetermined value; and generating the samples of the plurality of groups of samples associated with frequencies higher than the highest frequency that is not equal to the predetermined value to have the predetermined value.

24. A device for entropy decoding video data, comprising:

a memory configured to store at least a portion of a bitstream representing a block of the video data, the block comprising a plurality of groups of samples, the bitstream including at least one group-wise skip value indicating that a corresponding group of samples of the block is not included in the bitstream; and a processor in communication with the memory and configured to:

generate the plurality of groups of samples via entropy decoding the bitstream based at least in part on the group-wise skip value;

determine that the plurality of groups of samples is encoded via one of a plurality of coding modes;

in response to the coding mode being the first coding mode, group the plurality of groups of samples into the first block using a first grouping technique; and in response to the coding mode being the second coding mode, group the plurality of groups of samples into the block using a second grouping technique, wherein the first grouping technique and the second grouping technique are different.

25. The device of claim 24, wherein the samples of the block include a plurality of color coordinates, wherein the processor is further configured to:
- group the plurality of groups of samples based at least in part on their color coordinates; and
- reconstruct the block via combining the plurality of groups of samples.

26. The device of claim 24, wherein the processor is further configured to apply at least one reverse transform to the samples in response to the coding mode of the block being a transform mode, a first group of the plurality of groups of samples having a different number of samples from a second group of the plurality of groups of samples.

27. The device of claim 24, wherein the processor is further configured to generate each of the samples in the group of samples corresponding to the group-wise skip value to have a predetermined value.

28. The device of claim 27, wherein the processor is further configured to:
- receive a position of a sample associated with a highest frequency that is not equal to the predetermined value; and
- generate the samples of the plurality of groups of samples associated with frequencies higher than the highest frequency that is not equal to the predetermined value to have the predetermined value.

* * * * *